(12) United States Patent
Cowans

(10) Patent No.: US 6,814,064 B2
(45) Date of Patent: Nov. 9, 2004

(54) HIGH EFFICIENCY ENGINE WITH VARIABLE COMPRESSION RATIO AND CHARGE (VCRC ENGINE)

(76) Inventor: Kenneth W. Cowans, 1213 E. El Mirador Dr., Fullerton, CA (US) 92835

( * ) Notice: Subject to any disclaimer, the term of this patent is extended or adjusted under 35 U.S.C. 154(b) by 17 days.

(21) Appl. No.: 10/694,770

(22) Filed: Oct. 29, 2003

(65) Prior Publication Data

US 2004/0083991 A1 May 6, 2004

Related U.S. Application Data

(62) Division of application No. 09/995,674, filed on Nov. 29, 2001, now Pat. No. 6,708,654.
(60) Provisional application No. 60/253,799, filed on Nov. 29, 2000.

(51) Int. Cl.[7] ............................................... F02B 33/00
(52) U.S. Cl. ....................... 123/559.1; 123/562; 60/609
(58) Field of Search ........................... 123/559.1, 559.3, 123/562; 60/609, 611, 612

(56) References Cited

U.S. PATENT DOCUMENTS

| | | |
|---|---|---|
| 3,633,552 A | 1/1972 | Huber |
| 3,741,175 A | 6/1973 | Rouger |
| 3,805,752 A | 4/1974 | Cataldo |
| 4,033,304 A | 7/1977 | Luria |
| 4,036,202 A | 7/1977 | Weslake |
| 4,046,111 A | 9/1977 | Nagano |
| 4,066,045 A | 1/1978 | Suzuki |
| 4,157,080 A | 6/1979 | Hill |
| 4,181,102 A | 1/1980 | Yagi et al. |
| 4,182,284 A | 1/1980 | Yagi et al. |
| 4,182,288 A | 1/1980 | Thauer |
| 4,218,993 A | 8/1980 | Blackburn |
| 4,241,703 A | 12/1980 | Lin-Liaw |
| 4,241,705 A | 12/1980 | Karaba et al. |
| 4,286,552 A | 9/1981 | Tsutsumi |
| 4,306,526 A | 12/1981 | Schaub et al. |
| 4,480,968 A | 11/1984 | Duerr |
| 4,502,283 A | 3/1985 | Wandel |
| 4,503,815 A | 3/1985 | Amm |
| 4,505,117 A | 3/1985 | Matsuoka |
| 4,516,537 A | 5/1985 | Nakahara et al. |
| 4,651,703 A | 3/1987 | Hoppie |
| 4,715,347 A | 12/1987 | Hampton et al. |
| 4,738,110 A | 4/1988 | Tateno |
| 4,760,703 A | 8/1988 | Minami et al. |
| 4,860,711 A | 8/1989 | Morikawa |
| 4,932,211 A | 6/1990 | Buthmann et al. |
| 4,940,029 A | 7/1990 | Rees |
| 4,987,863 A | 1/1991 | Daly |
| 4,996,953 A | 3/1991 | Buck |

(List continued on next page.)

FOREIGN PATENT DOCUMENTS

| | | | | |
|---|---|---|---|---|
| JP | 58222919 A | * | 12/1983 | ........... F02B/37/14 |
| JP | 59138748 A | * | 8/1984 | ........... F02D/21/08 |

Primary Examiner—Noah P. Kamen

(57) ABSTRACT

An internal combustion engine using variable compression ratio and variable fuel supply to one of two combustion chambers is presented. Varying the compression ratio is accomplished by changing the volume of a single combustion chamber. This, in combination with lean burning, results in a highly efficient prime mover particularly at the low torque outputs needed in passenger car applications. The relationship of compression ratio and fuel feed is varied with engine speed. Burning occurs in two stages, and this results in a clean exhaust. The invention allows very efficient throttling of two-cycle engines to be realized. A concept for supplying air to a two-cycle engine at very good efficiencies is also presented. The combination of these techniques can result in an engine for automotive use that is half the weight of conventional units with a thermal efficiency of 40% or more at average engine output.

4 Claims, 16 Drawing Sheets

U.S. PATENT DOCUMENTS

| | | |
|---|---|---|
| 5,101,776 A | 4/1992 | Ma |
| 5,115,775 A | 5/1992 | Gruenwald |
| 5,195,469 A | 3/1993 | Syed |
| 5,730,099 A | 3/1998 | Gillespie |
| 5,803,026 A | 9/1998 | Merritt et al. |
| 5,832,892 A | 11/1998 | Yaoita |
| 5,857,450 A | 1/1999 | Staerzl |
| 5,904,045 A | 5/1999 | Kapich |
| 5,934,228 A | 8/1999 | Wheat |
| 6,029,452 A | 2/2000 | Halimi et al. |
| 6,055,954 A | 5/2000 | Takada et al. |
| 6,095,111 A | 8/2000 | Ueda et al. |
| 6,125,801 A | 10/2000 | Mendler |
| 6,155,212 A | 12/2000 | McAlister |
| 6,260,520 B1 | 7/2001 | Van Reatherford |
| 6,302,067 B1 | 10/2001 | Merritt |
| 6,305,346 B1 | 10/2001 | Ueda et al. |
| 6,354,250 B1 | 3/2002 | Lopez |
| 6,434,940 B1 | 8/2002 | Araujo |

\* cited by examiner

Figure 10   IMEP psi with engine data

HIGH EFFICIENCY ENGINE WITH VARIABLE COMPRESSION RATIO AND CHARGE (VCRC ENGINE)

CROSS-REFERENCE TO RELATED APPLICATION

This application references Provisional Application Ser. No. 60/253,799 filed Nov. 29, 2000; of Ken Cowans titled, "High efficiency engine with variable compression ratio and charge; (VCRC engine)". This application Is a division of application Ser. No. 09/995,674, filed Nov. 29, 2001, now U.S. Pat. No. 6,708,654.

FIELD OF THE INVENTION

This invention relates to internal combustion engines designed to improve efficiency, improve power to weight ratios, and reduce emitted pollutants in a configuration which is readily manufacturable. The invention is most applicable to engines used in automotive applications.

BACKGROUND OF THE INVENTION

A major objective of the invention is to provide a prime mover engine, i.e. a device to derive mechanical energy from the heat energy of a burning fuel, with higher efficiency in a lighter weight and smaller configuration than has heretofore been the case; particularly at power demands less than the engine's maximum. The main use for the invention is for automobile power: For this application efficiency at low engine torque at moderate speeds is of prime interest since most of the time an automobile engine operates at approximately 10% of its maximum power output at moderate speeds-typically 1,500 to 3,000 rpm.

The engineering terminology used in this specification follows standard mechanical engineering practice. Three works have been used as engineering reference. These are:

Avallone and Baumeister, Ed., *Marks' Standard Handbook for Mechanical Engineers*, Tenth Edition, McGraw-Hill, 1996: referred to as 'Marks'.

Ricardo, Harry R., *The High Speed Internal Combustion Engine*, Fourth Edition, Blackie & Son, Ltd., 1967: referred to as 'Ricardo'.

Stephenson, R. Rhoada., *Should We Have a New Engine?*, Jet Propulsion Laboratory, California Institute of Technology, 1975: referred to as 'Stephenson'.

Current automotive practice is usually to employ a spark-ignition engine with an average thermal efficiency around 20%; i.e. about 20% of the thermal energy of the fuel used is transferred to mechanical energy. Alternatively, a compression-ignition engine, more commonly called a diesel engine, is used having a somewhat higher efficiency at low output. The added efficiency of the diesel engine is, in passenger car application, offset by the added weight of current diesel engines. A typical passenger car using a diesel engine is no more efficient than a car of equal performance using a spark engine. Comparisons of apparent mileage differences between spark engines and diesel engines is obscured by the difference in energy content of diesel fuel and gasoline. Diesel fuel has about 18% more energy for a given volume, liter or gallon, than does gasoline: Thus an accurate comparison of a diesel car that gave 40 mpg with a spark-engine driven car giving 32 mpg would show that the two vehicles use almost exactly the same amount of energy. Even more exact comparisons that consider performance of the two autos shows that the diesel-driven car is most often less efficient than an equivalent spark-engined vehicle. Support for this argument comes from the choice of Toyota and Honda in their choice of spark engines for the Prius and Insight vehicles respectively. These two cars are designed to provide the ultimate in fuel mileage using contemporary techniques.

The discussion above begins to illustrate the problem of increasing the efficiency of automobiles. It is not enough to increase maximum efficiency of the prime mover; the efficiency at low power outputs and the weight of the engine are of equal or greater importance. In order to accomplish this increase of system efficiency it is necessary to reduce engine friction; increase engine power-to-weight, and focus on increasing the efficiency of the detailed burning process in the engine. In today's environment it is also necessary to ensure that the engine does not pollute the environment. If the engine is not inherently clean any accessories added to remove exhaust pollutants to the degree needed today can easily reduce efficiency directly and the weight added for these accessories will detract from the vehicle's fuel mileage.

Current proposals mostly fail to globally address the complexity of this problem. Any solution that addresses internal combustion engine efficiency needs to consider the basic combustion process itself. To obtain high efficiency at very low power outputs a solution must address the problem of lean burning. Hydrocarbon fuels do not burn rapidly enough for use in an automotive sized engine at fuel-air ratios under around 50–60% of stoichiometric ratio. To obtain ultra-efficient burning at 10% of maximum power output it is necessary to efficiently combine the fuel with air at fuel air ratios around 15–20% of stoichiometric within the time it takes an engine to rotate 30–35° at around 2,000 rpm or about 3 milliseconds. No matter what is done to a bulk air-fuel mixture this has not proved feasible in workable systems.

Diesel engines sidestep this problem by finely dividing the fuel and spraying it into a hot air environment. The burning that results occurs around each droplet at a fuel-air ratio almost exactly stoichiometric: Thus a mixture that is nominally a bulk mixture of fuel and air at a low fuel-air ratio is really a mixture of micro-domains of fuel and air at near stoichiometric ratio. The penalties inherent in this approach include the high friction penalties attendant with the use of compression ratios around 20:1 needed for automotive-sized engines and the aforementioned added weight. This illustrates that the solution must firmly address the problem of mechanical friction.

Friction and its effect on the part-load efficiency is largely ignored in contemporary proposed automotive prime mover solutions. The effect of friction is a very complicated factor. Typical modern production automotive engines battle friction by employing sophisticated valving and induction systems to ensure that maximum bearing loads are encountered only at moderate and higher speeds, where journal bearings can endure higher pressure loadings. This allows these same journal bearings to be designed smaller and thus the bearings contribute less friction to degrade the engine's performance.

Current proposals mostly tail to globally address the complexity of this problem. Any solution that addresses internal combustion engine efficiency needs to consider the basic combustion process itself. To obtain high efficiency at very low power outputs a solution must address the problem of lean burning. Hydrocarbon fuels do not bum rapidly enough for use in an automotive sized engine at fuel-air ratios under around 50–60% of stoichiometric ratio. To obtain ultra-efficient burning at 10% of maximum power output it is necessary to efficiently combine the fuel with air at fuel air ratios around 15–20% of stoichiometric within the time it takes an engine to rotate 30–35* at around 2,000 rpm or about 3 milliseconds. No matter what is done to a bulk air-fuel mixture this has not proved feasible in workable systems.

It is highly desirable to realize an engine that is notably lighter and smaller for a given power output than conventional engines. It is well known that the fuel consumed by a road vehicle is approximately proportional to the vehicle's weight. Combining an increase in efficiency with lowered engine weight greatly increases the fuel efficiency of a vehicle system. This is especially true when the effects of what is called, in automotive technology, weight propagation are considered. This term describes the effects of changing the weight of any component of a vehicle system. Since the component must be carried by the vehicle system and the component's mass must be stopped by the vehicle's brakes the inevitable effect of changing the weight of any of the vehicle's components further entails a change in the weight of the vehicle by about 70% of the initial weight change. Thus a reduction of engine weight of 100 pounds will result in a total weight reduction of about 170 pounds due to the effects of weight propagation.

Internal Combustion Engine Pollutants

Another objective of the invention needed in today's environment is to create a prime mover than burns fuel in a manner that is inherently clean; whose combustion process inherently produces few contaminants associated with internal combustion engines. Such an engine will need fewer or smaller cleanup mechanisms such as catalytic converters used with it to meet increasingly stringent requirements for engines in public use.

Internal combustion engine pollutants are of two general kinds: Oxides of nitrogen and unburned or partially unburned hydrocarbons (carbon monoxide production in engines can be considered as resulting from partial burning of the carbon in a hydrocarbon fuel). Diesel, or compression-ignition, engines produce particulates, microscopically small pieces of carbon and other matter due to the nature of combustion in compression-ignition engines. Well designed engines using homogeneous mixtures of fuel and air such as are burned in typical spark-ignition engines have little tendency to produce significant quantities of particulates.

Oxides of nitrogen are produced when oxygen and nitrogen are heated together to very high temperatures (ca. 2,500° C. and above) such as occurs in burning fuel-air mixtures. Production of nitrogen oxides is intensified when burning fuel-air mixtures are close to stoichiometric ratios. Production of oxides of nitrogen is reduced in mixtures of burning fuel and air that have an excessive amount of either fuel or air and are further reduced by burning the fuel-air mixture in conjunction with inert gasses such as recycled exhaust products (EGR). Stephenson shows data from Blumberg, P., and Kummer, J. T., "*Predictions of NO Formation in Spark-Ignited Engines-An Analysis of Methods of Control*", Combustion Science and Technology, Vol. 4, pp 73–95. This showed that an engine produced vanishingly small amounts of nitrogen oxides when fuel was burned in an atmosphere with 40% excess fuel or air in surplus over stoichiometric proportions when a small amount of EGR was present. These data are shown in graphical form in FIG. 9.

Complete burning the fuel in an engine, with the consequence that small quantities of unburned hydrocarbons or carbon monoxide result from the process, is most thoroughly accomplished by burning with an excess of air over stoichiometric proportions at elevated temperatures followed by oxidation in a catalytic convertor. Thorough burning such lean mixtures, however, is not easily implemented. Uniformly mixed lean mixtures burn too slowly to be useful in an engine designed to be used at speeds of 1,000–6,000 rpm if the burning is initiated in the uniformly mixed air-fuel bulk blend.

Efficiency in Internal Combustion Engines

The efficiency of an internal combustion engine is determined by complicated relationships. In order to obtain an optimum efficiency it is necessary to balance many individual factors. Each of these tends to counteract, in some way or ways, the effects of the others. The main parameters that need to be considered in the design are:

a. Basic thermal efficiency b. Friction between internal parts that occurs as the engine runs c. Non-linearities due to chemical interactions within the burning fuel-air mixture.

d. Pressure drops that occur as air moves into the engine and exhaust products are expelled from the engine.

1. Basic Thermal Efficiency

The efficiency of a prime mover is the percentage of heat energy obtained from the fuel burning that is converted to useful mechanical energy. Indicated thermal efficiency is a term used to describe the percentage of the energy obtained from the fuel that is converted to mechanical energy within the engine even though some of this energy may not be available outside the engine due to factors such as friction within the engine and the energy used to run ancillary mechanisms needed for engine operation. Brake thermal efficiency is the term used to describe efficiency of the engine in terms of the percentage of heat energy of the fuel that is available outside the engine as usable energy. Friction converts some of the basic mechanical energy delivered from the engine process to heat before mechanical energy is transferred outside the engine: The difference between indicated thermal efficiency and brake thermal efficiency is thus that percentage of the heat energy used up in moving engine parts against internal friction of the engine, in pressure drops undergone by gases flowing within the engine and that energy needed to drive accessory mechanisms within the engine essential to the engine's operation. This last category includes fuel pumps, water pumps and valve gear.

2. Friction of the Internal Parts that Occurs as Engine Parts Move

As noted above, friction takes away from the net thermal efficiency of the engine. Mechanical friction in an internal combustion engine mostly originates from bearings supporting the crankshaft, rubbing of pistons on their cylinder walls and friction in the valve mechanism. Bearing and piston friction is dependent on loads within the engine. The loads will vary with the detailed design of the engine but are always a function of the compression ratio of the engine: A higher compression ratio results in larger bearing and piston loads. Marks, Section 8, shows that the size of bearings and their relative friction power loading is proportional to the load or force placed on the bearings. The data also show that journal bearings can support a load that is proportional to the notational speed of the bearing shaft.

The use of a large compression ratio will increase the indicated thermal efficiency of an engine. However, a rise in the compression ratio of an internal combustion engine always gives rise to an increase in the friction of a real engine, as opposed to the engine as a theoretical entity. This results in a decrease in the average operating efficiency at compression ratios over about 8 to 1 in the case of spark ignited engines used in vehicle transport. This is clearly shown in Ricardo; one of the basic texts on internal combustion engines. The relationship that leads to this conclusion is found in the fact that most of the usage of an engine for passenger road transport in particular, and practically all prime movers in general, occurs at outputs far less than the maximum that can be derived from the engine. Thus an engine that has a high efficiency at full power with a compression ratio of 10 to 1 will be less efficient in overall passenger car usage than a correctly designed engine having a compression ratio or 8 to 1 when both engines are operated at 30% of their maximum torque. This torque level is typical for passenger transportation needs and also approximately representative for many applications of prime movers. The reason for the higher efficiency of the engine using an optimum compression ratio is that the bearings and other load supporting members of the engine must be designed to be large enough to withstand the highest pressure internal to the engine that the engine will endure. This results in larger frictional losses in the engine using the higher compression ratio: These larger frictional losses are more than offset by higher indicated thermal efficiency at full torque demand but when the engine's usage on an overall basis is analyzed the average efficiency of an engine with a compression ratio of about 8 to 1 will be more efficient than that of an engine having a compression ratio of 10 to 1. The fact that the engine is used delivering a typical torque of around 30% of maximum means that the efficiency during this service is more important to average efficiency than the efficiency of the engine delivered when the engine is used at full torque.

3. Non-Linearities Due to Chemical Interactions within the Burning Fuel-Air Mixture A high compression ratio also incurs some chemical losses. The efficiency gains engendered by the use of higher compression ratios are obtained because heat is extracted from the fuel at higher temperatures as the compression ratio is raised: Any heat engine is more efficient as the temperature at which the heat is added to the engine is raised relative to the temperature at which heat is rejected from the engine. This comes from basic Carnot teachings. At temperatures above about 2000° C. two effects, disassociation and non-linear specific heat, occur in the fuel-air products of carbon dioxide and water vapor,- the basic products of burning organic fuels. The effect of these two phenomena is to reduce the useful amount of heat that can produce energy in the engine. Thus as an engine is designed to use higher and higher compression ratios, the deviation from theoretical efficiency increases so that the actual efficiency becomes less because of the friction effects noted previously and also due to the fact that effects of disassociation and variable specific heat counteract some of the added efficiency gained from the higher compression ratio. Chemical losses are counteracted by using lean mixtures within the engine; mixtures of fuel and air that have excessive amounts of air.

4. Pressure Drops that Occur as Air Moves into the Engine and Exhaust Products are Expelled from the Engine As any gas passes through a tube or other like conduit a pressure gradient in the gas is required to maintain the velocity of the gas through the conduit. The same statement applies to gas passing through a port, or entrance, to the conduit or exit from such passage: A loss of pressure and thus energy is encountered wherever gas is transported at significant velocity. This energy must be supplied by the engine and thus creates a loss of efficiency. As noted above in the section on friction these pressure drops can be considered a form of mechanical friction.

Design Approaches for High Efficiency in Internal Combustion Engines

Balancing the above parameters is not a simple task. The optimum engine would have negligible friction, high compression ratio, low gas velocity in all transfer passages and would burn the fuel in a lean mixture at practically all times. The VCRC engine uses a unique approach to obtain an engine close to this ideal.

SUMMARY OF THE INVENTION

The VCRC concept is based on a unique method of optimization and minimization of the losses in an internal combustion prime mover in creating a prime mover of the highest efficiency. Implementation of the concept details also results in an internal combustion engine whose combustion inherently creates little pollutants of unburned hydrocarbons, carbon monoxide or oxides of nitrogen.

System and Subsystems

Engines in accordance with the invention accomplish the above objectives by increasing the compression ratio as the torque demanded of the engine is decreased throughout the engine's throttling range. As the compression ratio is raised the engine simultaneously provides for a leaner burning of the fuel ingested into the engine using a method of separated charge combustion. The combination of higher compression ratio together with leaner burning raises the efficiency of the engine in situations during which torque demanded of the engine is less than maximum. Since practically all applications of prime movers perform the bulk of their duties at these lower torque values the overall efficiency of systems using the inventive approach is equally increased.

This approach has many features but is characterized herein as Variable Compression Ratio and Charge (VCRC). VCRC engines particularly allow efficient throttling of two stroke cycle engines to be accomplished. This efficiency is further enhanced by a subsystem of the invention applicable to two stroke engines. With a unique arrangement of engine-driven blower and exhaust-driven turbo charger even further increases of efficiency in two-stroke versions of the VCRC can be achieved.

The VCRC engine accomplishes a reduction in both oxides of nitrogen and unburned hydrocarbons by a method of burning in two phases. First the fuel is burned in a uniformly mixed fuel-rich environment which includes some EGR. This mode of burning minimizes the creation of oxides of nitrogen. The initial burning is immediately followed by a completion of the burning process in an environment in which air is present in excessive quantities when compared with that amount needed to completely burn the fuel.

Thus in the VCRC internal combustion engine the compression ratio and the amount of fuel burned (the 'charge') during each firing cycle are simultaneously varied in response to torque demanded of the engine. A decrease in torque demand is accompanied by an increase in the engine's compression ratio and a reduced fuel flow. The relationship of compression ratio and fuel supplied is varied in such a manner as to keep the peak pressure in the engine's combustion process at a nearly constant level for all torque demands at a given speed. The relationship of the two parameters of compression ratio and fuel-air ratio are also varied as speed of the engine changes so as to raise the combustion peak pressure with an increase in engine speed.

Engines in accordance with the invention also include subsystems that enable the basic engine to perform with increased efficiency and allow the design to be smaller and lighter than engines now in common usage.

The engine varies the compression ratio and mixture ratio simultaneously by arranging the engine so as to have a combustion volume in two chambers connected by a passageway. The volume of one of these chambers is varied by a separate piston subsystem mechanism: Burning is initiated in this variable volume chamber after it has been filled with a uniformly mixed fuel-air mixture. The rise in pressure and temperature caused by the initial burning forces the fuel air mixture out of the variable volume to mix with the remaining engine volume in which volume burning is completed.

The variable volume combustion chamber is varied by a piston mechanism arranged to be both reliable and easily controllable. A hydraulic snubber is used in a preferred embodiment in conjunction with a piston designed to oscillate in a reciprocating motion each engine cycle. By such design the piston remains reliably lubricated in its cylinder during operation. The hydraulic snubber provides accurate and easily implemented control of the piston's motion.

The VCRC engine's method of combustion offers other advantages also. By separating the combustion into two phases; an initial combustion of the bulk of fuel and air in an fuel over-rich environment followed by a completion of combustion in a high temperature fuel-lean mixture, the problems of detonation are almost entirely eliminated. Detonation, or knock as it is colloquially called, is an explosion of the last 5% or less of the bulk fuel-air mixture. An overly rapid rise in pressure brought about by the initial combustion of the fuel-air mixture creates a pressure wave that compresses an isolated mixture of fuel and air and the accompanying rise in temperature of this isolated mixture creates an explosive situation wherein this mixture spontaneously combusts giving the resultant explosive increase in pressure and noise. In the VCRC engine the 'end gas', as this isolated fuel air mixture is called in internal combustion engine engineering, consists only of air. Thus the concept of octane requirements for the fuel used are moved so far off the engine's boundary limits as to be of essentially no import. The fuel for a VCRC engine can be most any mixture of fuel oil, of a low octane number, and gasoline with a higher value. The need for a high cetane number, necessary for smooth combustion in compression ignition engines, is equally unimportant.

The VCRC engine is exemplified here as a two-cycle engine. The invention is most suitable to the two-stroke configuration but is not limited to this: A four stroke configuration based on the same principles could also be easily realized. Some subsystems that are singularly adaptable to a two-cycle engine are also part of the invention. These include a unique method of supplying air to the engine in a manner that minimizes the losses associated with air transport.

The VCRC concept also includes a unique method of combustion to extract energy from a burning fuel-air mixture at higher efficiency than is now commercially possible in an internal combustion engine. This method of burning has the advantage of chemically combining air and fuel while creating fewer pollutants than does current engine designs. The VCRC method separates the air and fuel-air mixture in the engine into two divided volumes. Burning is initiated in the portion of the air that contains substantially all of the fuel and only part of the air used to support the combustion in a uniform mixture that is over-rich in excess fuel. The VCRC engine could be designed to provide a uniform mixture that is excessively lean as well. A perfect balance between fuel and air, called a stoichiometric ratio is avoided because this ratio results in an excessive production of nitrogen oxides. The combustion process is completed by combining the initial burned air and fuel with the remaining air. The remaining air is present in the combustion chamber in more than sufficient quantities to oxidize all the fuel in the chamber.

This method of combustion, used in conjunction with the variable volume noted above allows lean fuel-air mixtures to be burned at elevated compression ratios in an engine assembly that has low mechanical friction. This creates internal engine efficiencies higher than previously thought possible.

Stratified Charge Vs. Separated Charge

Stratified charge has long been used as a method to obtain lean burning in a spark-ignition engine. There are various ramifications but most have a single generic embodiment in common. A small volume separated from the main combustion chamber is supplied with a charge of fuel and air that is rich in fuel. This charge is fired with a spark and the flame from this ignites the charge in the remainder of the combustion chamber which latter charge is much leaner. In this manner it is possible to fire charges as lean as around 50–60% of stoichiometric. Combustion that takes place only in the small separated volume is often used to support very low torque values; around 10% of maximum. Between around 10% to around 40% the typical stratified charge engine is unstable and needs other mechanisms to appropriately throttle the engine. Stratified charge design also has some problems with efficiency as well. Near the lean limit of the stratified charge approach there is trouble firing the charge in the main combustion volume rapidly enough for operation. The slow burning results in a loss of some of the heat energy of the charge and also results in incomplete combustion as well.

The VCRC engine uses what can best be termed as 'separated charge'. The entire amount of fuel to be burned is contained in a separate variable volume together with around 60% or less of the air that is to be reduced by the combustion process. In this manner the difficulties of stratified charge burning are not present. The bulk of the fuel is burned at rapid velocity in the initial phase of combustion. Then, when the mixture of unburned fuel and very hot exhaust products mix with the remaining air the entire amount is at a temperature high enough to complete the combustion process rapidly.

A system that could be called 'separated charge' has been employed in versions of compression-ignition (Diesel) engine. Ricardo shows some varieties of this. The 'pre-combustion chamber design' and the 'Comet Mark III' can each be considered to utilize a combustion method that can be characterized as 'separated charge'. In these engine configurations fuel is injected into a volume separated, by a short gas passage or passages, from the main cylinder volume. In this volume about 50% of the total air used by the engine is reduced by burning of the injected fuel in a manner that can be considered conventional compression-ignition engine spray combustion. Subsequently the hot mixture of fuel and combustion products are combined with the remaining air in the rest of the cylinder volume. The process allows up to 90% of the air to be burned (in the Comet Mark III) at full throttle showing that the process can be used to burn fuel at any level of leanness as long as all the fuel and some air are mixed in a fuel-rich burning amalgam in the initial phase of the burning process.

BRIEF DESCRIPTION OF THE DRAWINGS

A better understanding of the invention may be had be reference to the accompanying specification, taken in conjunction with the following drawings in which.

DETAILED DESCRIPTION OF THE INVENTION

Construction of the Engine

Figure 1:
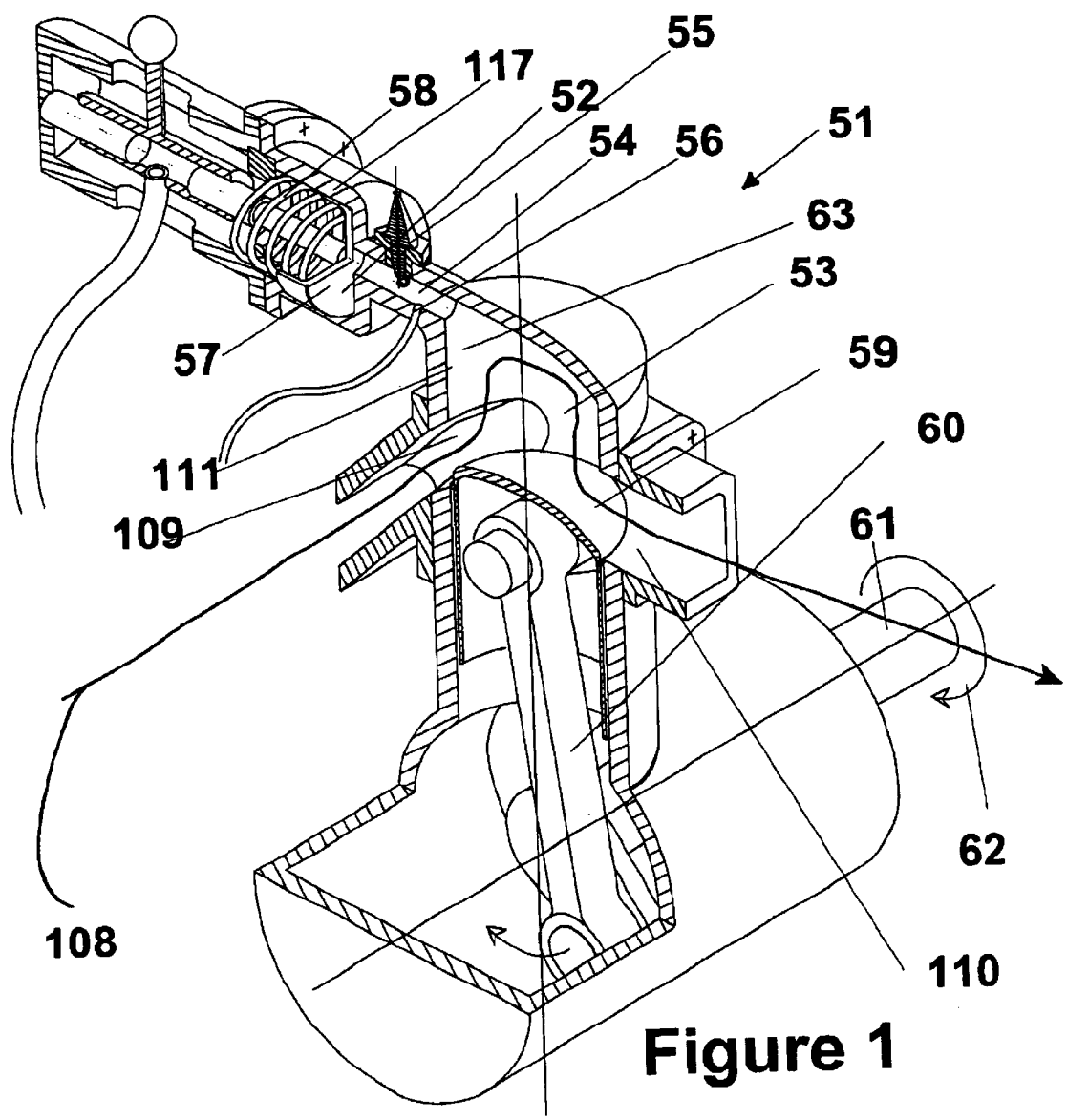
FIG. 1 is a perspective view partially broken away of a two-stroke engine using the invention in a scavenge phase of operation.

The construction of an engine in accordance with the invention can be best understood by referring to FIG. 1. A two-stroke engine 51 is fitted with a combustion chamber 52 of variable volume. Gas within the engine can pass freely between combustion chamber 52 and the cylinder volume 53 through a gas passage 54. A spark plug 55 is located in communication with gas passage 54. An injection nozzle 56 is so situated as to spray fuel into the engine in gas passage 54. Injection nozzle 56 is located generally towards the end of gas passage 54 closest to cylinder volume 53 and spark plug 55 is located generally at the other end of passage 54 closest to variable volume 52. The volume of combustion chamber 52 can be varied with the movement of an auxiliary piston 57. Auxiliary piston 57 is moved so as to minimize the volume of variable combustion chamber volume 52 in the absence of any other forces by the action of a spring 58. Two-stroke engine 51 incorporates a power piston 59 which is coupled via a connecting rod 60 to a crankshaft 61 in conventional engine fashion. The crankshaft rotates as shown by the arrow 62 in FIG. 1.

The type of engine illustrated in FIG. 1 and the other drawings is characterized as a loop-scavenged two-stroke engine. Other types of two-stroke engines would serve equally as well as a basis to use the invention. As noted previously, four-stroke engine designs could be used alternatively.

Intake port 109 is connected to a source of air in the VCRC engine. An exhaust port 110 is connected to reject exhaust products away from the engine. Exhaust port would be connected to an exhaust manifold in a multi-cylinder engine and from thence would connect to catalytic converters, a turbine of a turbo-charger or the like. Both intake and exhaust ports are opened and closed by movement of power piston 59 in a cylinder 111.

Figure 4:
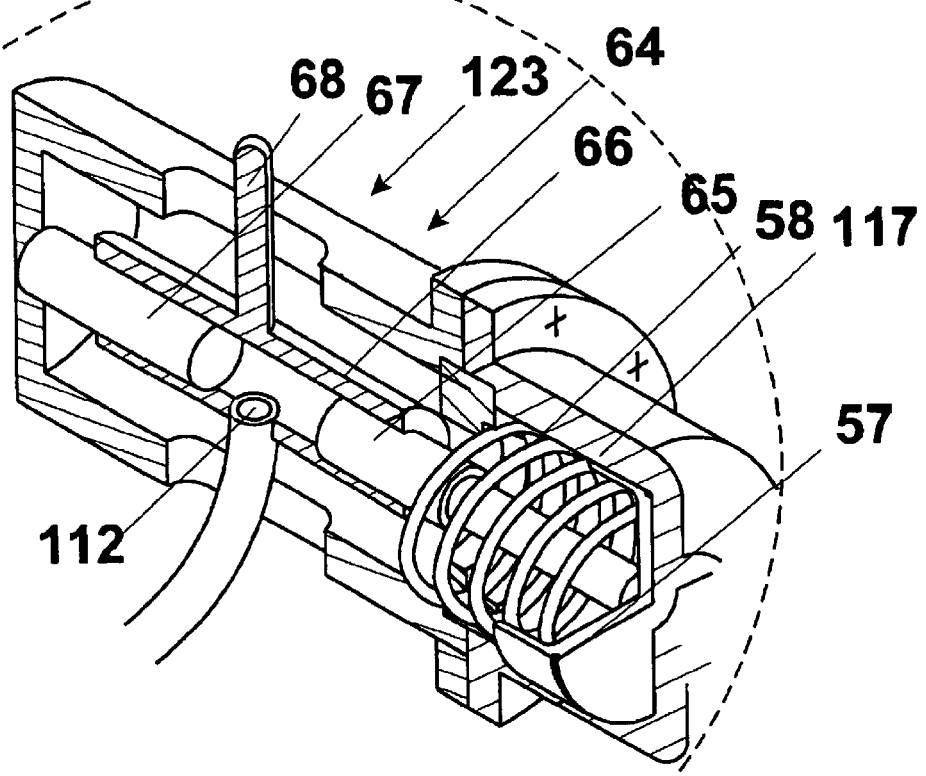
FIG. 4 is a fragmentary view partially broken away of one possible mechanical assembly that can be used to implement the control of compression ratio conceptually depicted in FIG. 2.

Referring now to FIG. 4 as well as FIG. 1, a hydraulic snubber 64 limits the travel of auxiliary piston 57. Hydraulic snubber 64 is comprised of a hydraulic piston 65 mounted in a hydraulic regulating cylinder 66, which hydraulic regulating cylinder is slidably mounted on a fixed hydraulic piston 67. Hydraulic cylinder 66 is moved to the correct position by force supplied by the controller of the engine acting on a regulating lever 68. Implementation of this snubber function could be accomplished with a number of mechanisms as will be appreciated by those skilled in the art but a hydraulic mechanism such as that shown has the advantage of being reliable and simple to implement. During operation in a single engine cycle auxiliary piston 57 moves from one end of its travel, wherein volume 52 is nearly zero, to the other end of its travel, limited by the placement of hydraulic snubber 64. Through this cyclical motion the interface between auxiliary piston 57 and the cylinder wall enclosing auxiliary piston remains lubricated during operation. If auxiliary piston 57 were to remain motionless for a number of cycles the surface of cylinder 117 could lose any lubricant film on it causing piston 57 to partially or completely stick and become motionless or erratic in motion.

Control of the System

Figure 2:
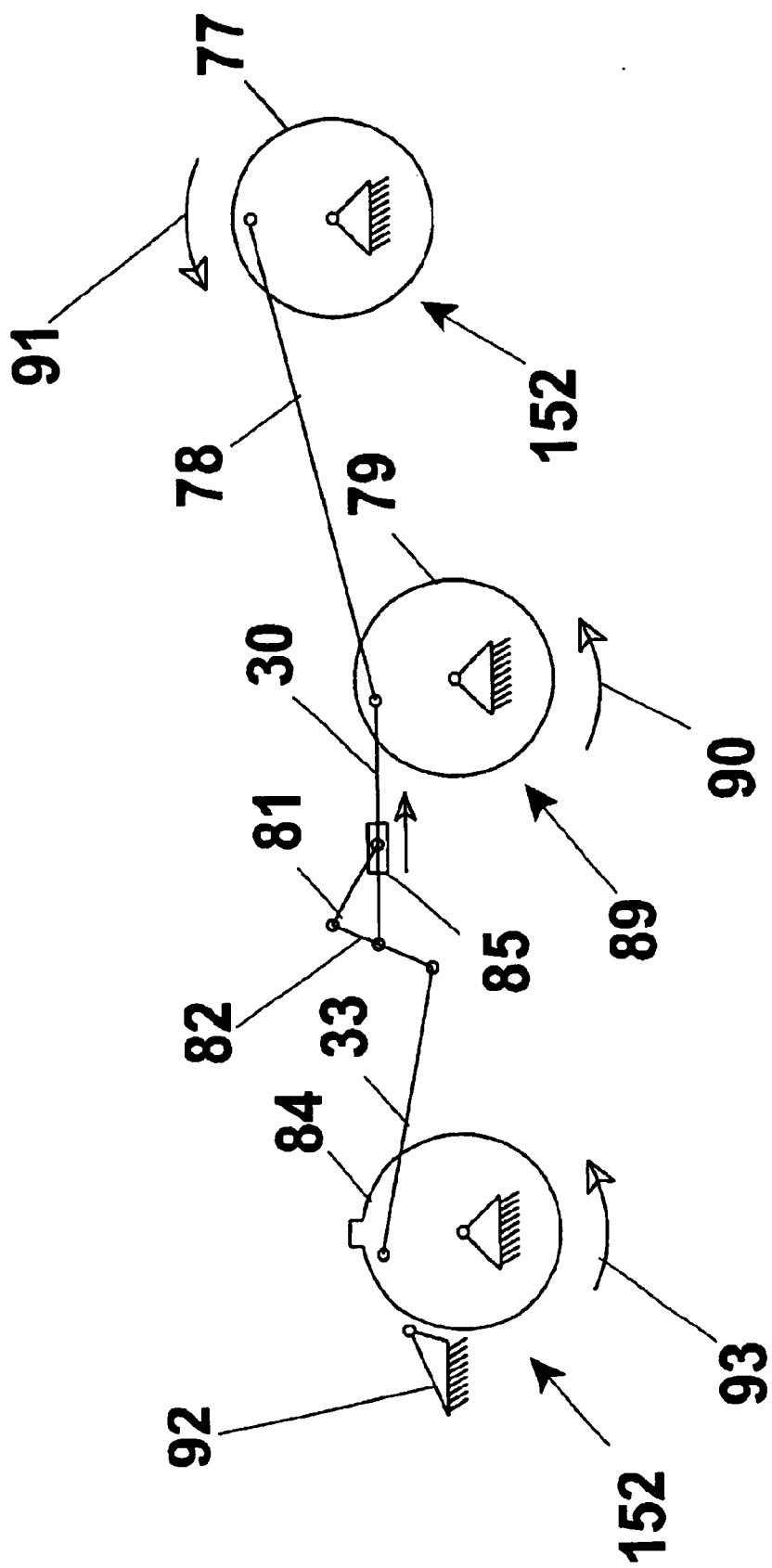
FIG. 2 shows a schematic concept for a system that links throttle control of the engine with compression ratio control and fuel injection regulation with an override control to modify the relationship with engine speed.

FIG. 2 illustrates the basic concept of control of various parameters by the Variable Compression Ratio and Charge or VCRC engine control linkage system. This drawing shows a schematic representation of the manner in which the three functions of compression ratio, fuel feed and engine speed are linked in the VCRC control system. A throttle control wheel 77 is rotated counter-clockwise by the operator of the engine to increase torque. This rotation actuates a throttle control linkage 78 to rotate a compression ratio control wheel 79 which regulates the engine compression ratio through operation of a mechanism such as that shown in FIG. 4. As control wheel 79 is rotated counter-clockwise under the action of throttle control wheel 77 and throttle linkage 78 the compression ratio of the engine is reduced. Control wheel 79 is linked, through a compression ratio linkage rod 80, an auxiliary linkage rod 81, a speed adjustment linkage rod 82 and a fuel feed linkage rod 83 to a fuel feed control wheel 84. As control wheel 84 rotates counter-clockwise more fuel is supplied to the engine at each cycle. The maximum travel of the torque control system is limited by a throttle stop 92. A specific mechanism for controlling compression ratio and fuel feed is not indicated in FIG. 2. A variety of mechanisms for providing the interrelated functions may be used by those skilled in the art of engine design. The particular method of controlling compression ratio in the invention is unique to the present invention as has been discussed.

A speed adjustment slider 85 is used to compensate for the beneficial effects of speed on the load-carrying abilities of journal bearings. As slider 85 moves to the right in FIG. 2 the effect is that of lengthening the connection between compression ratio control wheel 79 and fuel feed control wheel 84 with the result that more fuel is fed to the cylinder for a given value of compression ratio or, looked at another way, the torque for a given amount of fuel fed will be higher as speed increases due to the fact that the compression ratio is higher. If torque demand is held constant, as speed increases there will be somewhat less fuel supplied for each revolution and the compression ratio will increase compared to the settings for the same torque at a lower speed.

Correcting for speed with this system concept somewhat counteracts the effects of friction: Friction increases as speed is raised due to the effects of lubricant viscosity and velocity of gasses passing in and out of the engine as described previously. The increase in inefficiency due to friction effects is partially offset by the added thermal efficiency brought about by increased compression ratio and leaner burning. The higher compression ratio can be better supported by the engine's bearings because the load capability of journal bearings increases as the shaft rotational speed is raised.

Operation of the Engine

Referring again to FIG. 1 and FIG. 4: The VCRC engine at idle uses only gas passage 54 for a combustion space. In this mode of VCRC operation slide 65 is moved through operation of control rod 68 so that auxiliary piston 57 nominally cannot move from its position closing combustion chamber 56. In this position auxiliary piston 57 closes off the volume in combustion chamber 56 so that the combustion chamber volume is nominally zero. During idle the engine needs a small amount of torque to run the engine's accessories and any other devices such as air conditioners and power steering pumps. The amount of fuel needed to support the energy required is fed in through injector nozzle 56 in a carefully timed manner. By regulating the time that the fuel flow starts and stops a temporary boundary between fuel rich and fuel absent air exists in air passage 54 during a compression stroke. The fuel rich volume will be bounded by auxiliary piston 57 at one end and at a position in air passage 54 at the other. Spark plug 55 is located at the end of air passage 54 near auxiliary piston 57 so that the mixture will burn upon firing of the spark plug. During idle throttle control is only present in the timing of the fuel injection: The compression ratio during idle mode is substantially constant. Although auxiliary piston 57 is nominally immobile during idle the compliance of all the parts in the assembly holding auxiliary piston 57 against gas pressure within the engine's working volume will allow piston 57 to undergo a small oscillatory motion that will keep the surface between piston 57 and cylinder 117 lubricated.

The advantage of keeping variable volume 52 substantially zero during idle has to do with heat transfer from the burning fuel. Operation of an engine in transportation duty is typically from 25% and up. At this torque requirement movable piston 57 will be far enough away from the wall at the end of its travel that the burning within the variable volume combustion chamber will be substantially unquenched. At torque requirements of 10–15% of maximum (typical of idle requirements) the piston head and the wall would be so close together that flame burning within the chamber would lose much of its heat to the walls since the percentage of heat lost from a contained gas space is strongly a function of the space between the walls: The loss is typically proportional to the inverse $2^{nd}$ or $3^{rd}$ power of the gap between the surrounding walls. Thus the design of the VCRC engine allows for torque values in the idle range to be burned only within transfer passage 54.

During operation of the engine a pressure is generated in working volume 63 of the engine; which working volume includes the total of cylinder volume 53, variable combustion chamber 52 volume, and the volume in gas passage 54. This generated pressure can force auxiliary piston 57 to move, thereby increasing the volume of variable combustion volume 52. It would also be feasible to move auxiliary piston 57 with actuators of different kinds such as hydraulic or electrical mechanisms.

Figure 13:
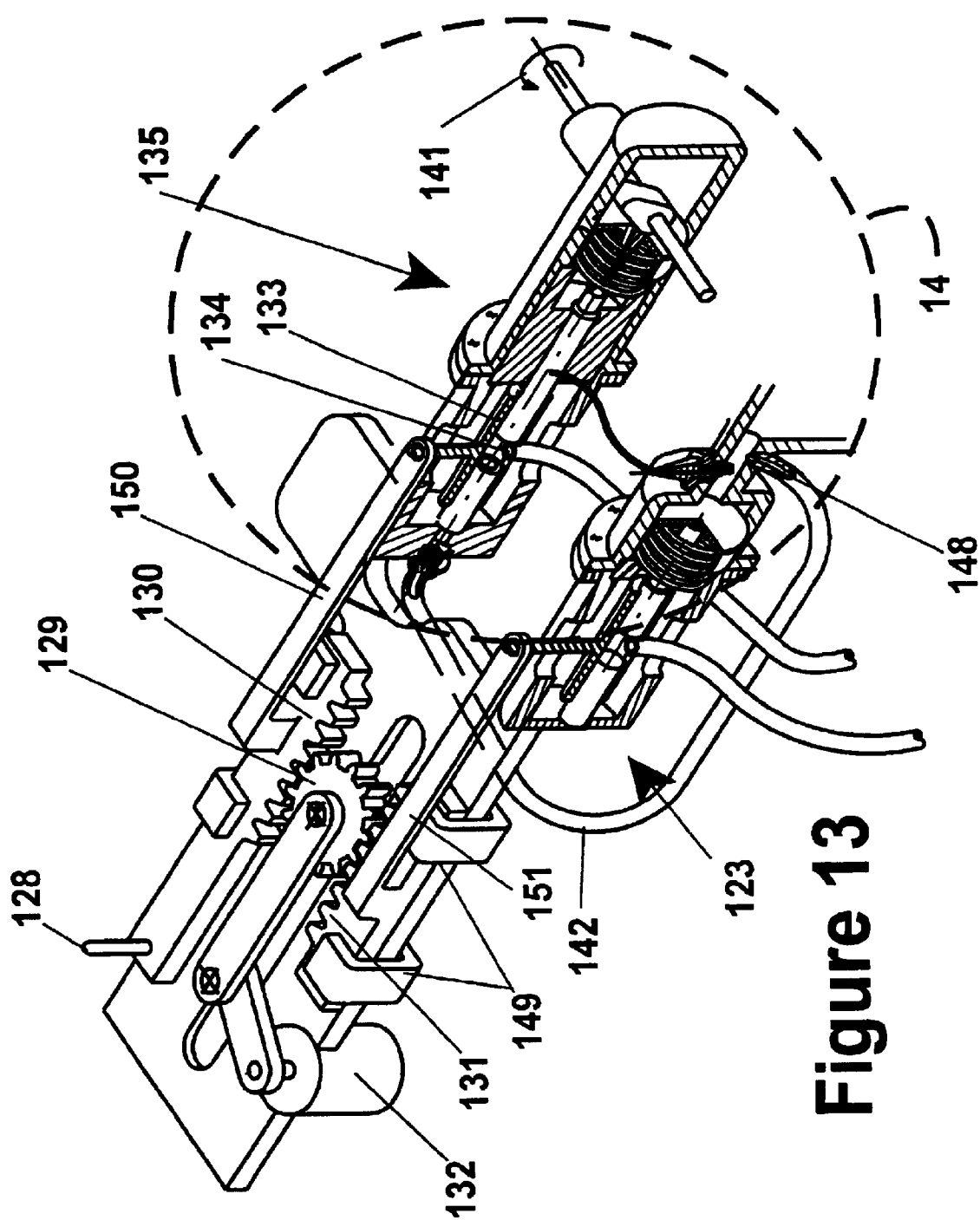
FIG. 13 is a depiction of a mechanical schematic of a system to implement the control interaction described in FIG. 2.

Lever 68 is connected to the throttle controller for the engine system. Lever 68 is also connected to the fuel injection system. The connections amongst the elements of throttle, lever 68 and fuel injection system is not shown in FIG. 1. One possible mechanical schematic that connects compression ratio control, fuel feed control and speed interaction control is shown in FIG. 13. The control relationship of throttle, compression ratio, speed and fuel feed is described in FIG. 2. A movement of the control towards increased torque demand is accompanied by a control for lowered compression ratio as well as for increased fuel flow. The simultaneity of these three commands and the organization within which they are linked provides the engine that uses the inventive concept with a potential for an efficiency of heat energy conversion to mechanical work higher than has been reached before in those sizes of prime mover used for transportation applications. This type of control mechanism could be reduced to practice using many types of conventional devices.

The throttle mechanism slides the hydraulic cylinder 66 so as to allow more or less movement of auxiliary piston 57 when pressure in the working volume of the engine forces auxiliary piston 57 outward from the engine so as to enlarge combustion chamber 52. The compression ratio of the engine is thus varied while the engine is running with the use of this mechanism. At the same time that the compression ratio of the engine is altered the connection from the throttle to the fuel injection system operates to alter the amount of fuel injected. The relationship is as follows: As the compression ratio is raised less fuel is supplied for each firing and vice versa. In this manner the peak pressure in the engine's cycle is held approximately constant at any given speed.

Figure 5:
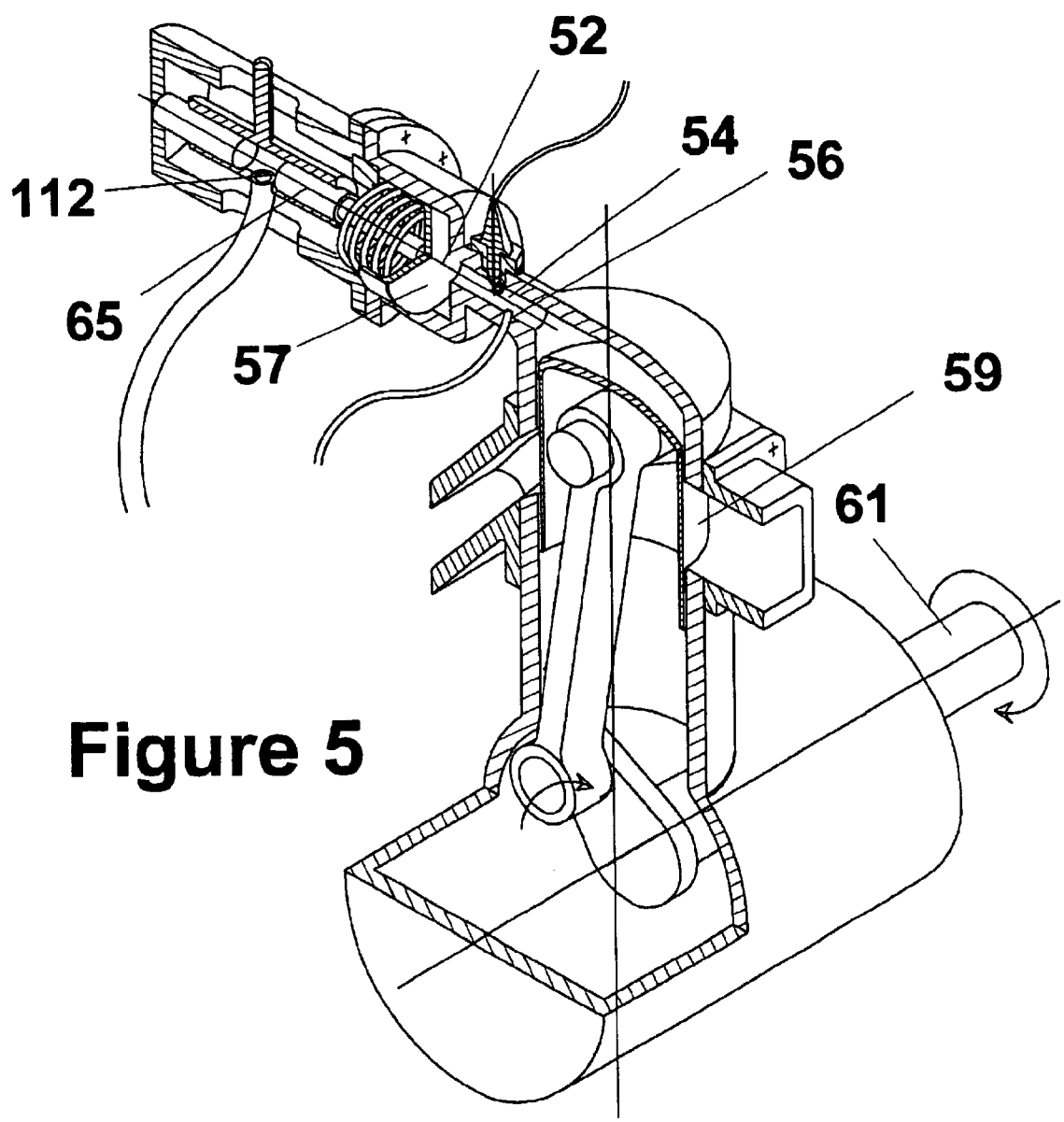
FIG. 5 shows a view of the engine in FIG. 1 during a compression stroke.
Figure 6:
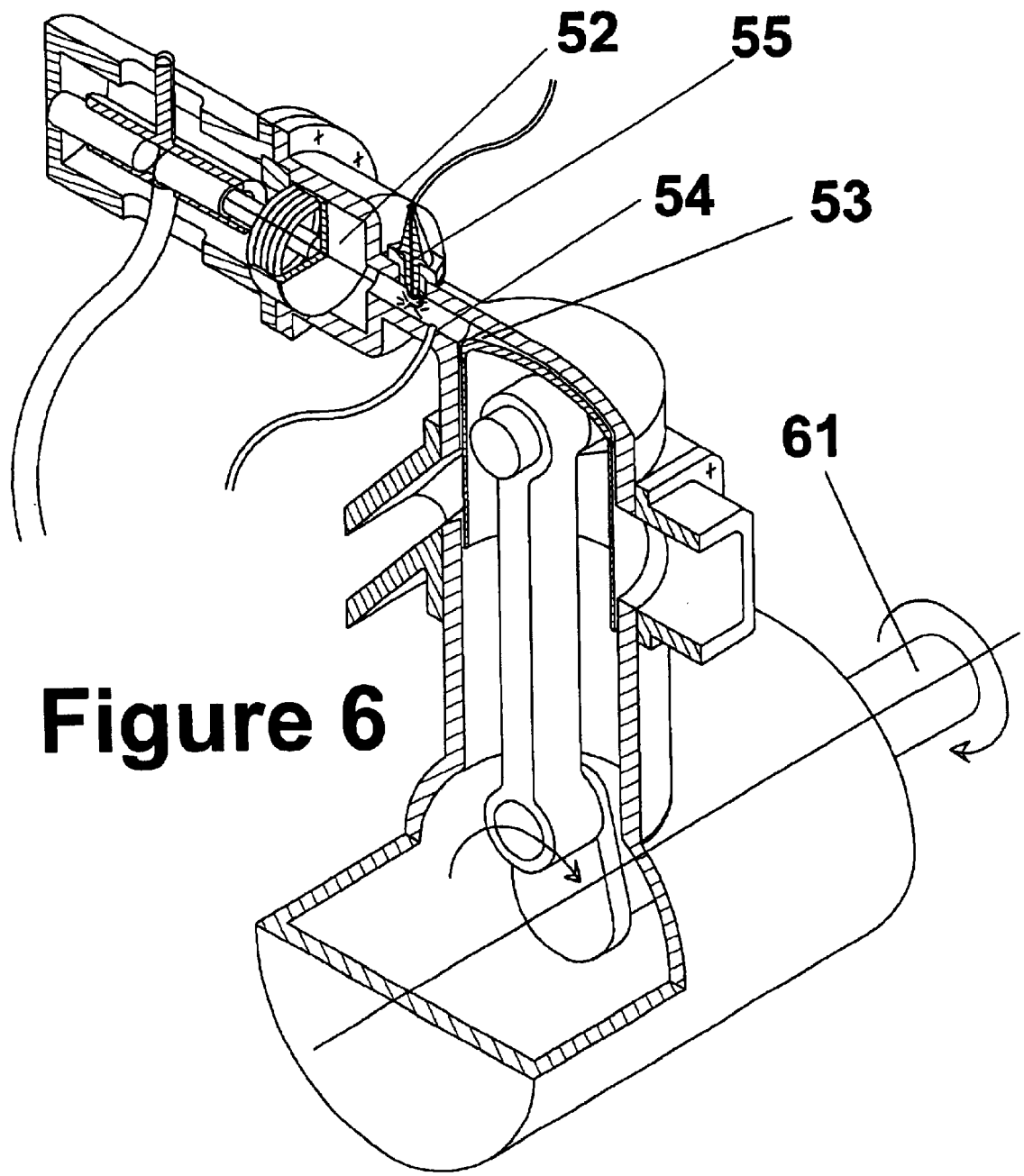
FIG. 6 shows the same engine during a combustion phase.
Figure 7:
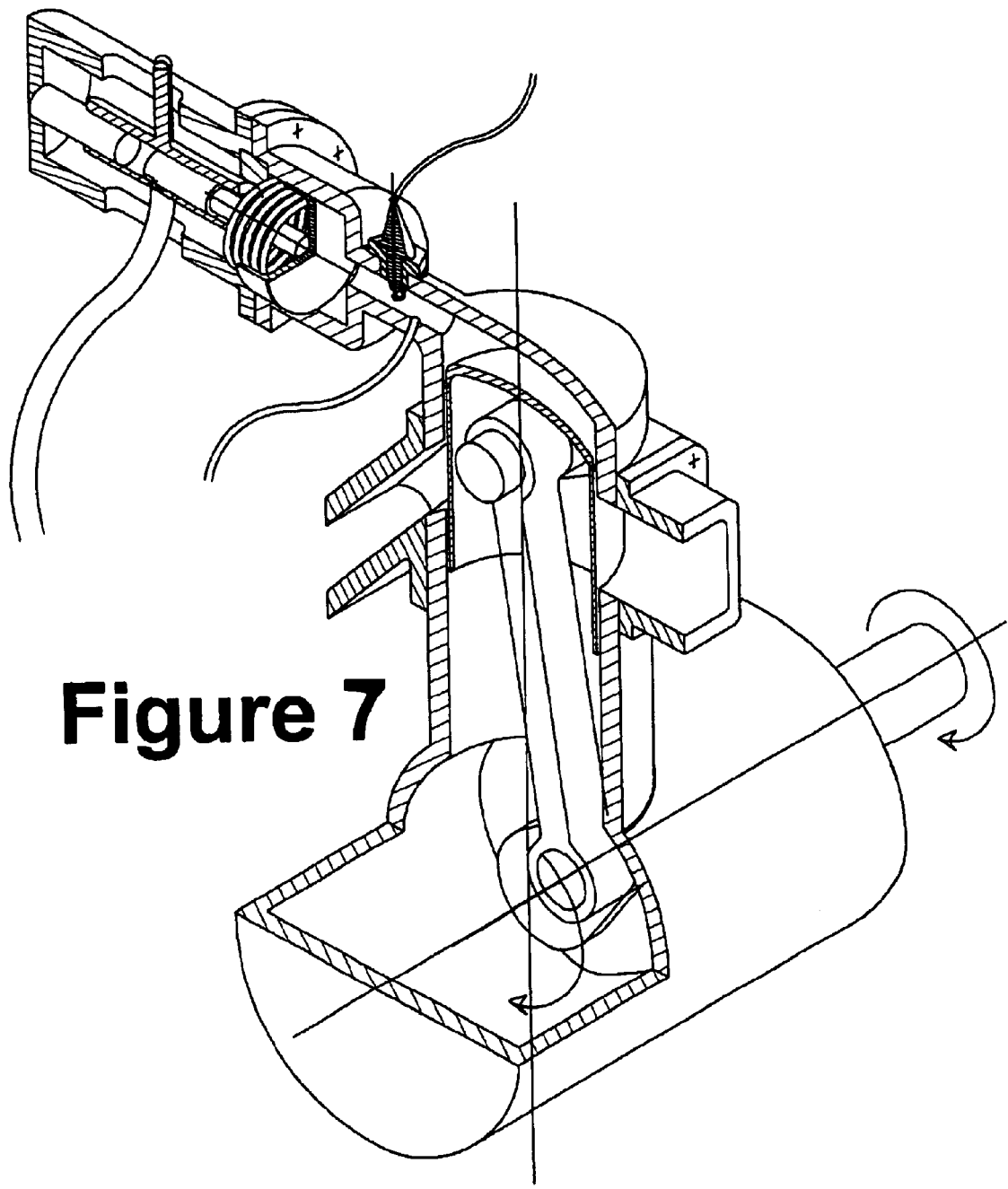
FIG. 7 shows the same engine during an expansion stroke.

Operation of a two-stroke engine can be broken into four repeating phases:
  a. Scavenge (ref. FIG. 1)
  b. Compression (ref. FIG. 5;
  c. Combustion (ref. FIG. 6)
  d. Expansion.(ref. FIG. 7)

FIG. 1 shows the VCRC engine in the scavenge phase. During this phase both the exhaust and intake ports are opened. In the VCRC engine, air without fuel is forced through the engine, entering the intake port and continuing out the exhaust port in the general direction of the arrow 108. This air first expels exhaust products from the engine and then introduces fresh air into the engine's working volume 63 which includes cylinder volume 53, gas passage 54 and variable volume 52. Scavenging is not perfect and the scavenging phase ends with an amount of exhaust products still remaining in working volume 63. The engine shown is generally characterized as a loop scavenged engine. Air flow through the engine follows a looping path as indicated by the arrow 108 in FIG. 1 as air flow traverses through cylinder volume 53. Any other type of two-cycle engine porting could equally be used but as the loop scavenged type is the most common the present discussion will be focused on this type of engine. Auxiliary piston 57 is in a position to reduce the volume of combustion chamber 52 to a minimum during the bulk of the scavenge phase. Spring 58 forces auxiliary piston to this position because the lack of pressure in cylinder volume 53 is at its lowest point since the exhaust port is open to the atmosphere.

The scavenge phase lasts typically about 120° of crankshaft operation. The phase starts, when power piston 59 opens intake port 109, typically about 60° before power piston 59 is at its bottom dead center (BDC) position or, in other words, 60° before power piston 59 is at the crankshaft position when power piston 59 is at the position closest to crankshaft 61 as power piston 59 travels up and down in its travel. The scavenge phase continues to about 60° after BDC. As can be seen from study of FIG. 1 the opening and closing of exhaust port 60 occurs symmetrically about BDC in a loop scavenged engine.

FIG. 5 shows the VCRC engine in the compression phase. During this phase power piston 59 compresses air in working volume 63, which includes cylinder volume 53, transfer port 54 and variable combustion volume 52. The rising pressure in working volume 63 forces auxiliary piston 57 to move against the force exerted by spring 58 on auxiliary piston 57. Motion of auxiliary piston 57 can also be effected by mechanisms driven by hydraulic, electric or other forces as may prove desirable. This movement of auxiliary piston 57 increases the volume of variable combustion chamber 52. Air moving from cylinder volume 53 through gas passage 54 to variable combustion chamber 52 passes by injection nozzle 56. During part or all of the compression phase fuel is injected through injection nozzle 56 into the air stream proceeding through gas passage 54.

As the compression phase continues hydraulic snubber port 112 (FIG. 4) is covered by hydraulic piston 65. This action prevents further movement of hydraulic piston 65 and thus movement of auxiliary piston 57. This position of auxiliary piston 57 determines the minimum volume of working volume 63 of the VCRC engine in the cycle under discussion and thus the compression ratio of this particular engine revolution. The compression cycle continues until power piston 59 is at or near top dead center (TDC) wherein power piston 59 is furthest from crankshaft 61.

FIG. 6 illustrates the combustion or firing phase. A few degrees before TDC, typically around 30 degrees or less, spark plug 55 fires and this action ignites the fuel air mixture in the vicinity of spark plug 55. In about the next 10 to 30 degrees of travel by crankshaft 61 all the oxygen in the fuel-air mixture in variable combustion chamber 52 and gas passage 54 will be consumed. This burning process greatly expands the fuel air mixture such that the exhaust products of the initial burning are forced to expand into cylinder volume 53. As is discussed elsewhere in this disclosure the fuel air mixture involved in the initial burning is often rich in excess fuel. The total mixture of air and fuel contained in working volume 63 is however lean in fuel and contains more air and therefore oxygen than is needed to burn the fuel in working volume 63. In the final time of the firing phase substantially all of the fuel in working volume is combined with oxygen.

FIG. 7 shows the expansion phase. After power piston 59 has passed a few degrees after TDC the firing phase becomes the expansion phase as working volume 63 expands the mixture of exhaust products and air within the engine. It is during the expansion phase that power is derived from the engine. The expansion phase of the VCRC engine is like the same phase of other engines in all details. The phase continues from a few degrees after TDC until power piston 59 opens exhaust port 110. Throughout this phase mechanism 123 operates so as to maintain variable volume 52 at the maximum value that volume 52 experiences during that particular cycle.

Figure 8:
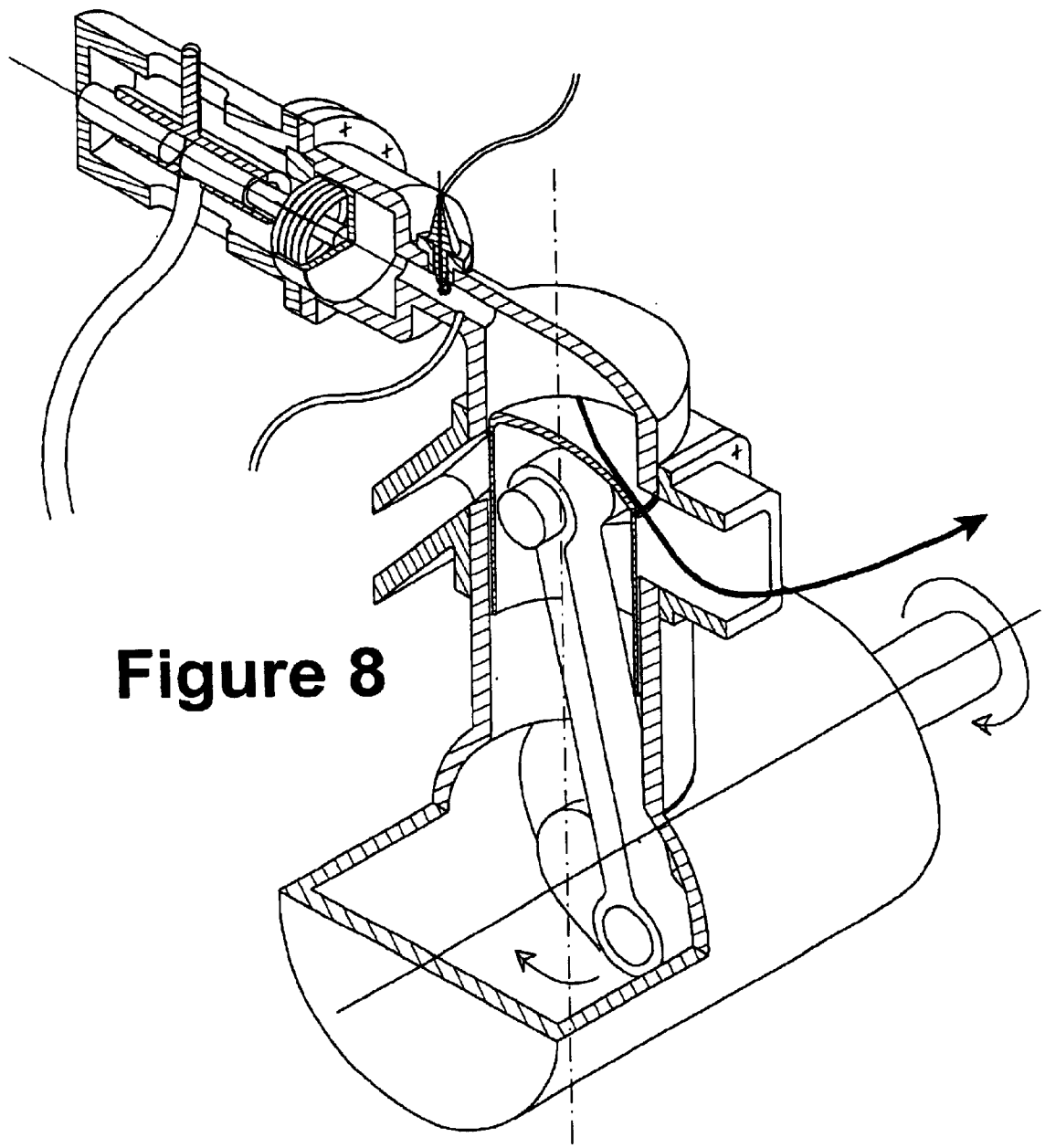
FIG. 8 shows the same engine during an exhaust phase.
Figure 9:
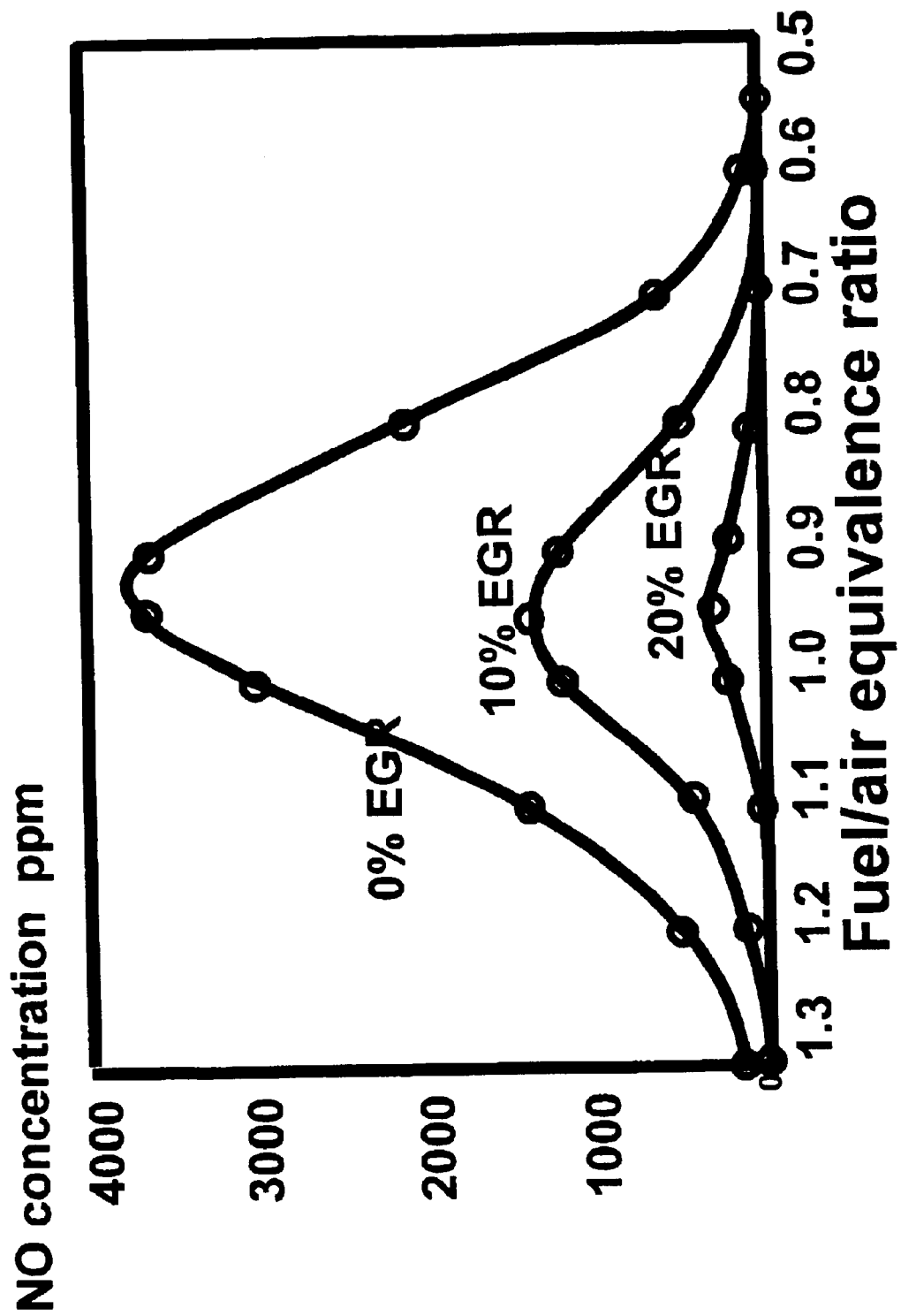
FIG. 9 is a graph depicting the production of oxides of nitrogen in a spark-ignited engine as a function of fuel-air ratio and exhaust gas recirculation.

FIG. 8 shows the exhaust phase of operation. Power piston 59 travels away from TDC far enough so that exhaust port 110 opens. After this port opens the exhaust gasses leave the engine working volume as indicated by arrow 161. Just before power piston 59 opens exhaust port 110 the pressure in working volume 63 is typically from 2 to 6 times the pressure of the surrounding environment. As the exhaust phase continues through about 10° to 20° of crankshaft travel the pressure in working volume 63 is reduced to a level near the environment just outside the cylinder volume. Throughout most of this operation auxiliary piston 57 remains forced against spring 58 so that variable combustion volume 52 remains open to the volume determined by position of hydraulic piston 65. At the end of the exhaust phase spring 58 forces auxiliary piston 57 to move towards a minimum volume. This pushes out exhaust products from volume 52 and readies the engine to enter into the scavenging phase and repeat the sequence. As noted, movement of auxiliary piston 57 could be driven by other mechanisms, e.g. hydraulic or electrical actuators.

Four Stroke Engine Operation

Figure 16:
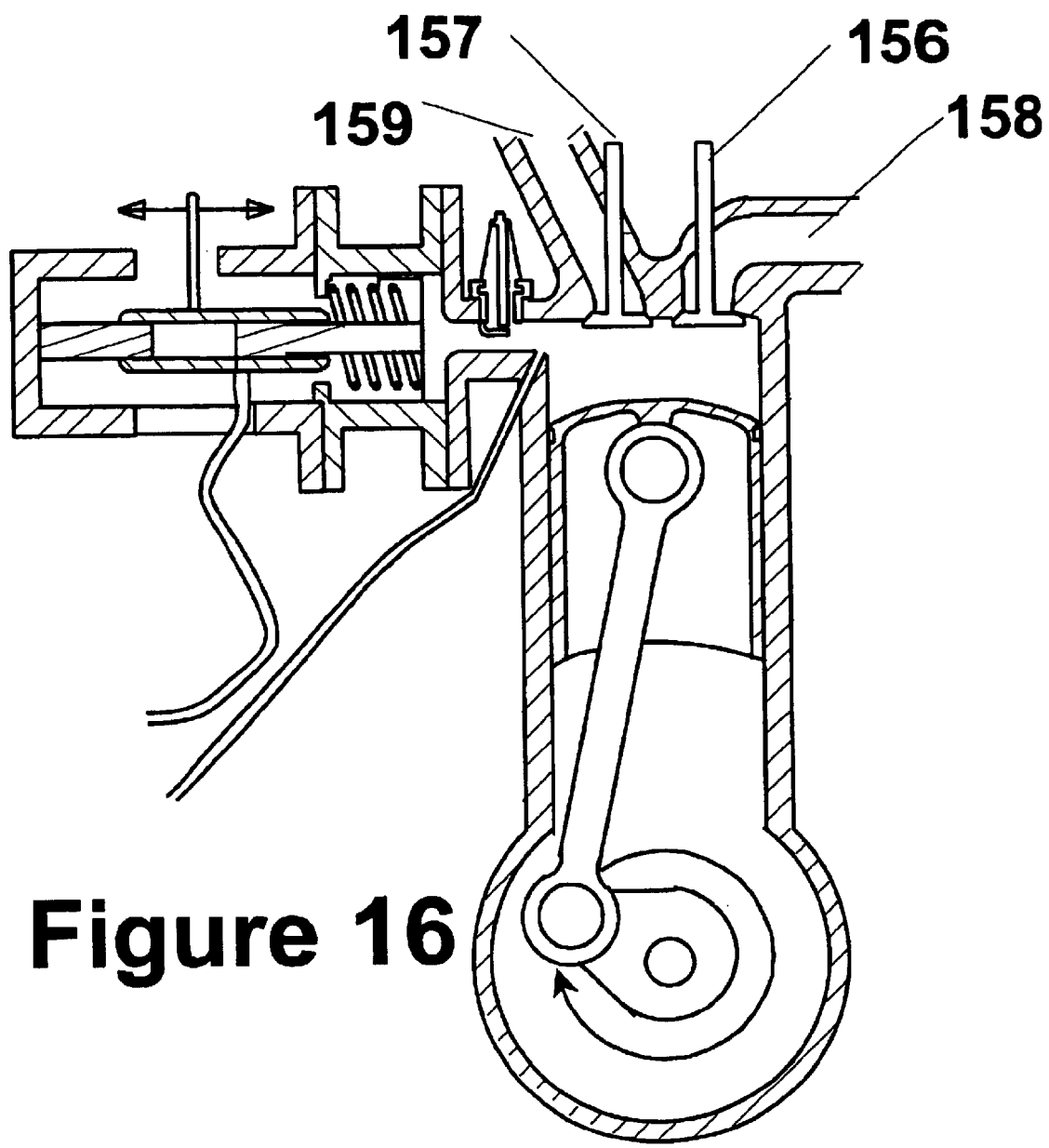
FIG. 16 is a cross sectional view of a four-cycle version of the VCRC engine.

A schematic representation of a four-cycle engine is shown in FIG. 16. Instead of the intake port 109 and exhaust port 110 in the cylinder walls of the engine their function is replaced by intake valve 157 with intake port 159 and exhaust valve 156 with exhaust port 158. Operation of the four-stroke VCRC engine would follow the two-stroke unit exactly as pertains to the compression, combustion and expansion phases. The scavenge phase of the two-stroke engine is replaced by two separate strokes of the four-stroke piston; an exhaust stroke as the piston travels from around bottom dead center (BDC) to close to top dead center (TDC) with exhaust valve 156 open followed by an intake stroke as the piston retreats from TDC to BDC with intake valve 157 open.

Mechanical Schematic of Control System

Figure 14:
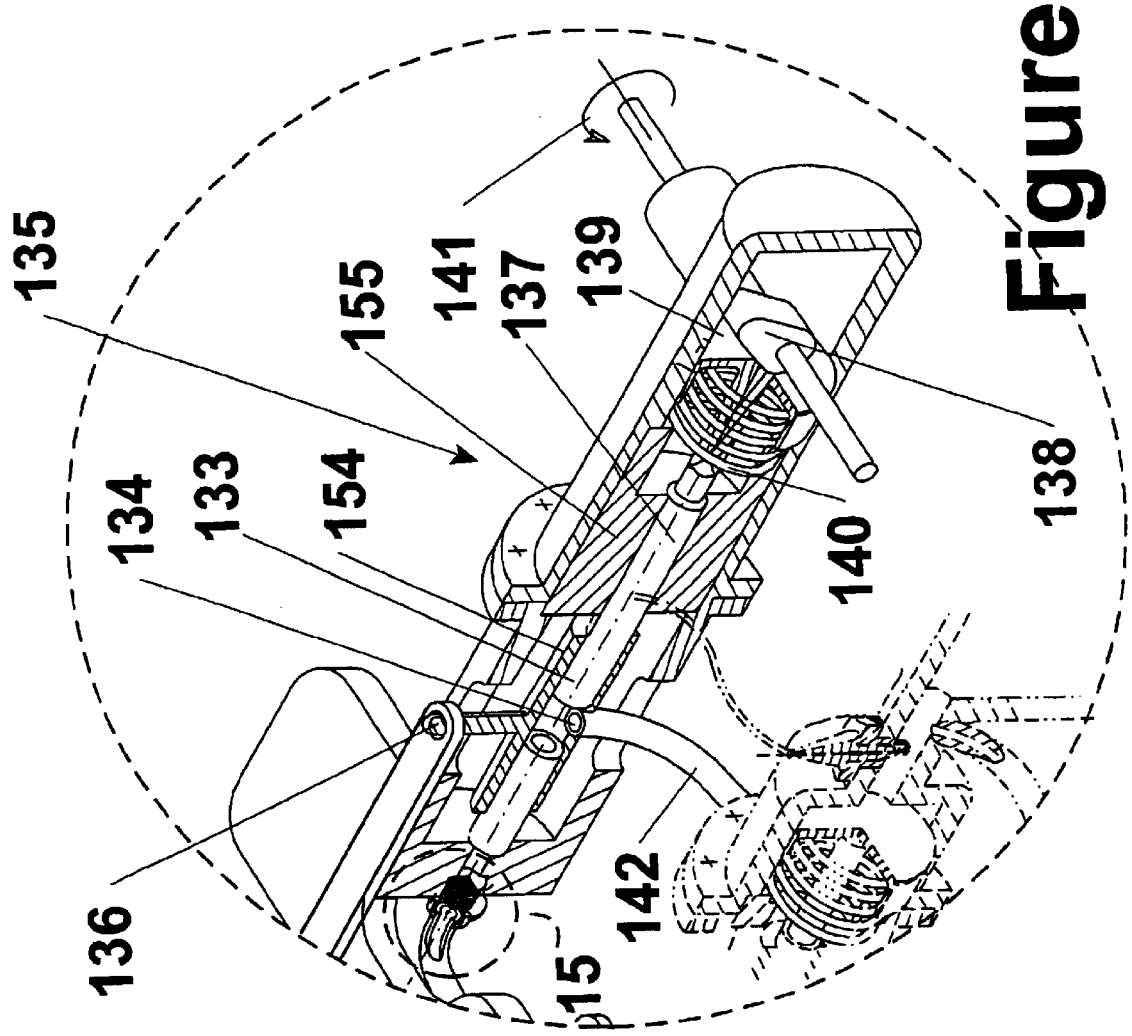
FIG. 14 is a fragmentary view partially broken away of one possible mechanical assembly that can be used to implement the pumping and control of fuel to a fuel injector to implement the control system conceptually depicted in FIG. 2. It is a combination pump and regulating mechanism.

FIG. 13 shows a mechanical schematic for reducing the control system shown in FIG. 2 to practice. It shows how a functioning system could be built with elementary mechanical structures. The mechanisms shown are auxiliary piston control mechanism 123 shown in FIG. 4, a fuel pump and controller 135 shown in FIG. 14 and a combination gear coupler controller 162 combined with a servo motor 132 to correct for the effects of speed as noted in a previous section. Operation is described in the following paragraphs.

Referring again to FIG. 1 and FIG. 4: The VCRC engine at idle uses only gas passage 54 for a combustion space. In this mode of VCRC operation slide 66 is moved through operation of control rod 68 so that auxiliary piston 57 nominally cannot move from its position closing combustion chamber 56. In this position auxiliary piston 57 closes off the volume in combustion chamber 56 so that the combustion chamber volume is nominally zero. During idle the engine needs a small amount of torque to run the engine's accessories and any other devices such as air conditioners and power steering pumps. The amount of fuel needed to support the energy required is fed in through injector nozzle 56 in a carefully timed manner. By regulating the time that the fuel flow starts and stops a temporary boundary between fuel rich and fuel absent air exists in air passage 54 during a compression stroke. The fuel rich volume will be bounded by auxiliary piston 57 at one end and at a position in air passage 54 at the other. Spark plug 55 is located at the end of air passage 54 near auxiliary piston 57 so that the mixture will burn upon firing of the spark plug. During idle throttle control is only present in the timing of the fuel injection: The compression ratio during idle mode is substantially constant. Although auxiliary piston 57 is nominally immobile during idle the compliance of all the parts in the assembly holding auxiliary piston 57 against gas pressure within the engine's working volume will allow piston 57 to undergo a small oscillatory motion that will keep the surface between piston 57 and cylinder 117 lubricated.

Motion of lever 128 directly moves fuel control arm 150 which is connected to the input lever 136 of fuel pump and fuel controller 135. Movement of lever 136 moves a vented cylinder 154. Cylinder 154 surrounds a fuel pump piston 137 which is constrained to move in an oscillatory fashion within cylinder 155. Piston 137 is driven to move back and forth under the influence of cam 138 which is connected to the crankshaft 61 of engine 51 to rotate as indicated by an arrow 141. Compression spring 140 keeps a piston cam follower 139 in contact with cam 138 to help effect the aforementioned oscillatory motion of piston 137. Fuel is supplied to the interior of cylinder 154 through a tube 142 which is connected to a source of fuel which is pressurized to a pressure adequate to supply fuel at the amount required by the operation of engine 51.

Figure 15:
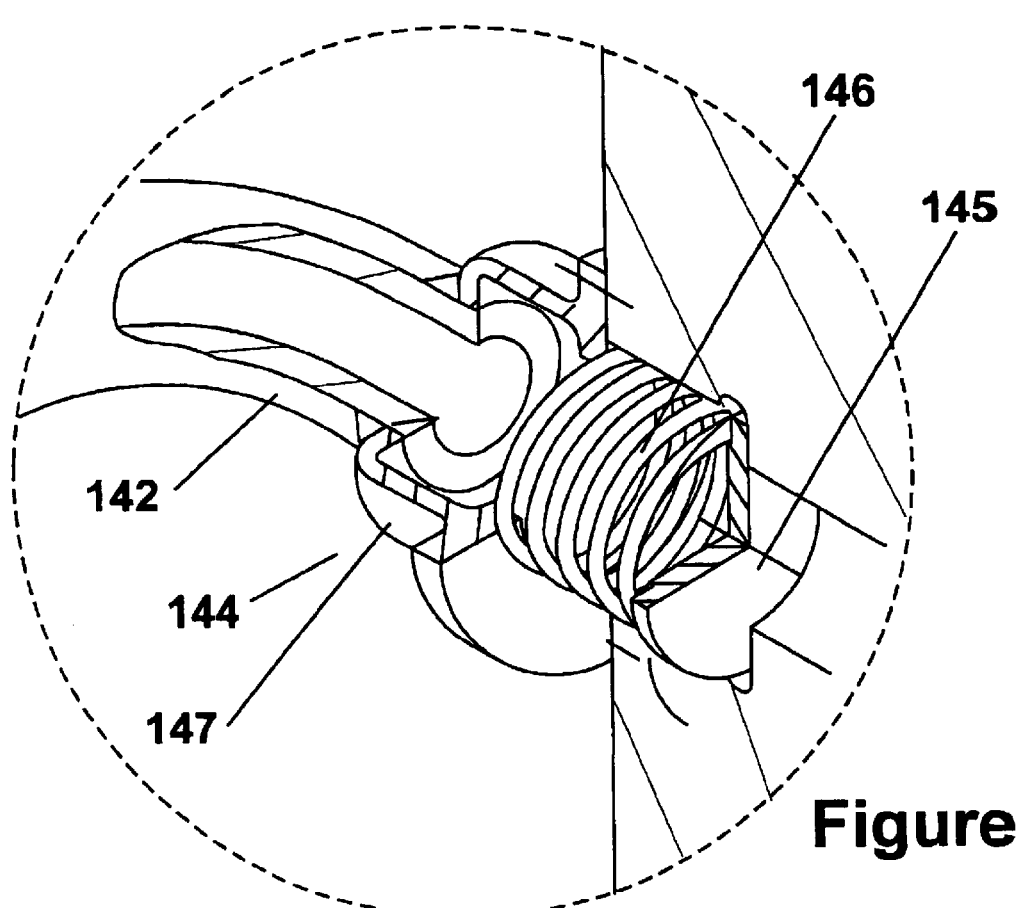
FIG. 15 is a detail of the device shown in FIG. 14.

As piston 137 moves towards cam 138 fuel is drawn into the interior of cylinder 154 through cylinder port 143. As piston 137 reverses motion and moves away from cam 138 fuel is driven back through tube 142 until the movement of piston 137 covers port 143. Further motion of piston 137 drives fuel out of cylinder 154 through spring-loaded check valve 144, shown in expanded detail in FIG. 15. The spring of valve 144 is of a high enough force such that it requires a pressure considerably higher that the pressure of the aforementioned pressurized fuel source in order for the fuel in cylinder 154 to open valve 144 by lifting piston 145 enough to allow fuel in cylinder 137 to escape though valve 144. After fuel passes through valve 144 it travels through a tube 162 to the fuel injector nozzle 56 where the fuel is sprayed into gas passage 54. Cam 138 and the connection of the cam drive connected to engine crankshaft 61 is designed to effect the injection of fuel into gas passage 54 while air is being transferred from engine cylinder volume 63 to variable combustion volume 52 during the compression phase of the engine as discussed before.

Lever 68 is connected to the throttle controller for the engine system. Lever 68 is also connected to the fuel injection system. The connections amongst the elements of throttle, lever 68 and fuel injection system are not shown in FIG. 1. One possible mechanical schematic that connects compression ratio control, fuel feed control and speed interaction control is shown in FIG. 13. The control relationship of throttle, compression ratio, speed and fuel feed is described in FIG. 2. A movement of the control towards increased torque demand is accompanied by a control for lowered compression ratio as well as for increased fuel flow. The simultaneity of these three commands and the organization within which they are linked provides the engine that uses the inventive concept with a potential for an efficiency of heat energy conversion to mechanical work higher than has been reached before in those sizes of prime mover used for transportation applications. This type of control mechanism could be reduced to practice using many types of conventional devices.

The moving of lever 128 influences the position of port 112 in auxiliary piston controller 123 through the action of gear coupler 162. As fuel port 143 is moved to limit fuel flow the auxiliary piston snubber port 112 (see FIG. 4) is moved via a rack 130, attached to lever 128, a gear 129, in contact with rack 130, a rack 131 and an auxiliary piston control arm 151. Control arm 151 directly moves regulating lever 68 which is attached to slidable cylinder 64. Cylinder 64 operates in the auxiliary piston controller 123 in a similar manner as does cylinder 154 in the fuel pump controller 135. As cylinder 64 moves to position hydraulic port 112 away from auxiliary piston 57 the movement of piston 57 can travel through a longer path as piston 57 is moved under action of increasing gas pressure. Due to the nature of the coupling among racks 130 and 131 and gear 129, as cylinder 154 moves to increase fuel flow cylinder 64 moves to increase the total travel of auxiliary piston 57 during each cycle. Thus as more fuel is supplied to the engine the travel of auxiliary piston 57 increases and this latter action increases the volume of variable volume combustion chamber 52, reducing the compression ratio of the engine.

The position of the central pivot point 160 of gear 129 will change the relationship between amount of fuel supplied and the compression ratio of the engine. As pivot point 160 moves away from fuel pump controller 135 a given amount of fuel supplied to the engine will result in a lower compression ratio. A servo motor 132 suitably designed for the task is positioned as shown in FIG. 13. A signal to servo motor 132 will position pivot point 160 to effect a suitable balance between compression ratio and fuel supplied. As speed increases pivot point 160 will be positioned closer to fuel pump controller 135 so as to effect a higher compression ratio for a given amount of fuel supplied for each engine cycle. This will increase efficiency as speed increases as noted in the section on control of the system discussed previously.

The control system of FIG. 13 responds to an input from sliding motion induced from a throttle command to throttle lever 128. As this lever is moved to the right in FIG. 13 fuel flow is increased as the sliding motion of lever 128 induces a like motion to movable fuel injection control cylinder 133. This motion moves the fuel valve port 134 to the right. Such motion allows an increase in the fuel supplied to the engine during the cycle.

Air Supply in Two-Stroke VCRC Engine

A blower must be provided to any two-cycle engine because this form of engine, unlike its four-stroke counterpart, does not function directly as an air pump. As noted above in the discussion of the operation of a four-cycle VCRC engine, the intake stroke and exhaust stroke function as an air pump to draw air from the surrounding environment. In low cost versions of two-stroke engines this pumping function is dealt with by the underside of the piston. Appropriate valving is used to enable the underside of the power piston to pump air first from the outside environment to the crankcase under the power piston and then to the working volume. This has the advantage of simplicity and concomitant low cost but has little else to recommend it. The air so pumped absorbs heat from the crankcase and the piston and also causes a high oil consumption to take place.

There is a fundamental problem with supplying two-stroke engines with air in an efficient manner. The two-stroke engine needs typically around 40% more air than a four-stroke engine of equivalent power to carry out a proper degree of scavenging. Since the power needed to pump air through an engine varies as the third power of the air volume pumped through an engine the limitation for the two-stroke is severe. Ricardo illustrates that a two-stroke engine at full throttle will be as efficient as a four stroke engine only at speeds less than about 50% of maximum rotational speed. Since normal engine practice is to supply the same volume of air at full throttle as at part throttle this is a severe limitation. The comparison at part throttle would be even worse. The subsystem discussed below deals with this problem in a manner that severely reduces the friction associated with air supply.

Figure 3:
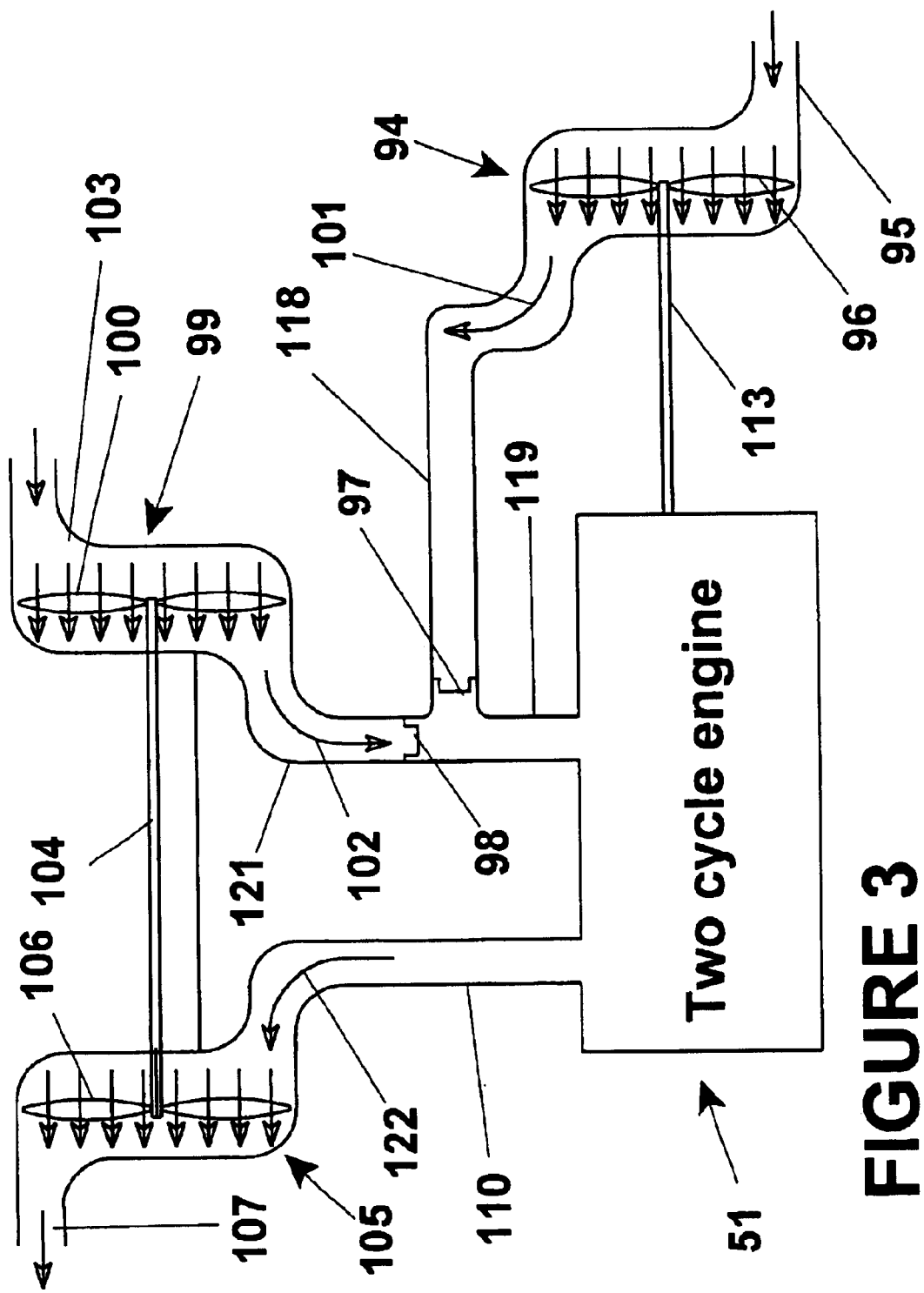
FIG. 3 shows, in block diagram form, an air supply arrangement that reduces flow losses during part throttle operation without limiting the power of the VCRC engine.

The VCRC engine in its simplest two-stroke form, could utilize a blower driven directly by the crankshaft to provide the air needs of the engine. This would have the disadvantage discussed above in that the power to force the large amount of air through the engine would absorb an excess of the engine output. A refinement of the invention that directly addresses and minimizes losses of air and exhaust gasses passing through passages into and out of the engine is to have the engine driven blower provide only a portion of the air that the two-stroke engine requires. The remainder of the air needed to oxidize the fuel burned under high torque demands would be provided by an exhaust-driven turbo-blower as schematically depicted in FIG. 3. The advantage of this system is that, for most of the usage of the engine, the engine driven blower supplies only a little more air than is needed to burn the fuel. The losses associated with pressure drop are thus very small since the energy consumed by such losses is proportional to the third power, or cube, of the flow rate of the air. Thus, as the engine is designed to have the shaft-driven blower supply only half or less of the maximum air flow, the losses at all torque demands below about half the maximum will be one eighth or less of what a more conventionally designed engine would engender. Power to drive the turbo-blower is derived from energy in the engine's exhaust that would be otherwise wasted and thus does not subtract from the output of the engine. This system would be equally useful in a conventional two-cycle engine because the air losses in any two stroke create a loss of efficiency: In conjunction with the efficiency enhancing factors present in the VCRC engine the added effect of the compound blower system disclosed above results in potential prime mover efficiencies higher than have heretofore been achieved.

FIG. 3 shows the VCRC compound blower system in schematic form. Two-stroke engine 51 drives an impeller 96 of a blower 94 through a shaft 113. Blower 94 takes air in an intake port 95 and drives the air through an intake passage 118 as indicated by arrow 101. As the air passes through impeller 96 it undergoes a pressure rise due to the action of impeller 96. After the air leaves blower 94 it passes through a lightly sprung check valve 97 on its way to two stroke engine 51 through an intake manifold 119 connected to intake port 109.

As the engine is required to provide more torque the exhaust driven blower 99 is forced to rotate faster because the exhaust has more energy due to the increased fuel flow and excess exhaust energy resulting from the lessened compression ratio thus imparting more drive to the turbo impeller 106. As impeller 106 of turbo blower 99 spins faster it will cause more air to be drawn through an intake port 103. The added pressure delivered by blower 99 will overcome the pressure at the output of blower 94 at some level of exhaust velocity. This over-pressure will force open a lightly sprung check valve 98 and allow flow from blower 99 to supply the engine as air flows through turbo driven blower 99 through an intake port 121 as shown by arrow 102. The same pressure in excess of that delivered by blower 94 will force check valve 97 to close thereby effectively stopping flow from blower 94. The two modes of operation; one in which blower 94 supplies all the air needed at low torques and the other in which blower 99 is the only supply, will overlap during the transition from one mode to the other. During this transition phase air will be supplied by both blowers in combining to satisfy the engine's requirements.

Certain mechanical details are needed to make the system operative. Exhaust flows from engine 51 to the exhaust driven turbine from exhaust passage 110 as indicated by arrow 122. After leaving the turbine the exhaust leaves the system through exhaust manifold 107 to mufflers, catalytic converters, etc. not shown. Power is transmitted from the turbine 105 to blower 99 by means of a rotating shaft 104.

The system is made more effective if blowers 105, 99 and 94 are of the centrifugal type, which is the usual case in automotive turbo-blowers. The characteristics of this type of blower suit the system shown in FIG. 3. When a centrifugal blower operates against a very high impedance and there is little or no flow through the blower very little power is needed to turn the impeller of the blower. This is opposite to the characteristics of a blower of the axial type: The axial type of blower requires a maximum of power under high head conditions and a minimum power requirement under high flow-low pressure conditions.

While the engine is operating at low torque substantially all the air is supplied by engine driven blower 94. Turbine 105 is being driven by exhaust gases but blower 99 requires very little power to spin up to full speed. This results in a turbo-blower that is ready for increased torque demand while blower 99 is not delivering flow. Because of the low power demand impeller 100 is almost up to speed and ready, with a small increase in speed, to deliver pressure higher than that of blower 94. Thus there wilt be relatively little time delay or 'turbo lag' when an increase in flow is demanded that will allow the engine to deliver increased torque.

During periods when torque demand is high and substantially all the air needed by the engine is supplied by turbo-driven blower 99 check valve 97 is forced substantially closed by the excess pressure induced in the intake system of the engine by turbo-driven blower 99. Since centrifugal blowers, as noted above, need very little power under conditions of low or zero throughput flow the drag on the engine will be reduced.

The blower subsystem shown in FIG. 3 is made even more effective due to the characteristics of VCRC engine operation. As discussed previously, high torque in the VCRC engine is delivered at lowered compression ratios: Exhaust energy in an internal combustion piston engine is oppositely proportional to the compression ratio of the engine. Thus the need for high energy in the turbo-blower, when added torque is demanded, is accompanied by a large increase in exhaust energy due to the lowered compression ratio in concert with added fuel flow. Ordinary internal combustion engines using turbo-blowers can suffer so-called 'turbo lag' or a perceptible delay in turbo speed increase when an increase in torque demand is needed. This is because the only energy increase in the conventional engine's exhaust is derived from an increase in fuel flow.

Throttling a Two-Cycle Spark-Ignition Engine

It is well recognized that the two-stroke type engine is potentially much lighter and potentially more efficient than the more conventional four-stroke engines. This is because there are two power strokes in the two-stroke engine for each in the four-stroke variety. Thus the engine does not weigh much more than half as much as a four-stroke equivalent engine. Since the engine produces twice as much power while employing the same or fewer parts there is basically less friction in the two-stroke engine.

There are two basic problems with the two stroke engine as an efficient prime mover. The most basic is the throttling problem. Two-stroke spark engines are most often regulated by restricting the input fuel-air mixture since they are normally fed a bulk carbureted mixture of gasoline and air. The effect of this restricting is only to retain exhaust products in the cylinder volume. Thus the efficiency is good at full throttle, limited only by the air breathing problem discussed before. At part throttle, however, the efficiency is much worse than the four-stroke equivalent. This is one of the main factors that has limited the usage of spark-ignition two-stroke engines.

As may be derived from a consideration of the description of the VCRC operation the throttling process is carried out in a manner that does not degrade the efficiency of the engine process in any way. Indeed, the use of a variable volume that participates in the throttling process and increases compression ratio as a fundamental part of throttling makes the throttling process one that vastly enhances the engine efficiency.

Estimate of VCRC Efficiency

The following analysis is given to illustrate the potential of the VCRC concept. It is quite simplified and many assumptions are made to more easily show the basic concept. A more precise analysis actually shows an even better efficiency, particularly at the higher levels of indicated mean effective pressure (IMEP)

Figure 10:
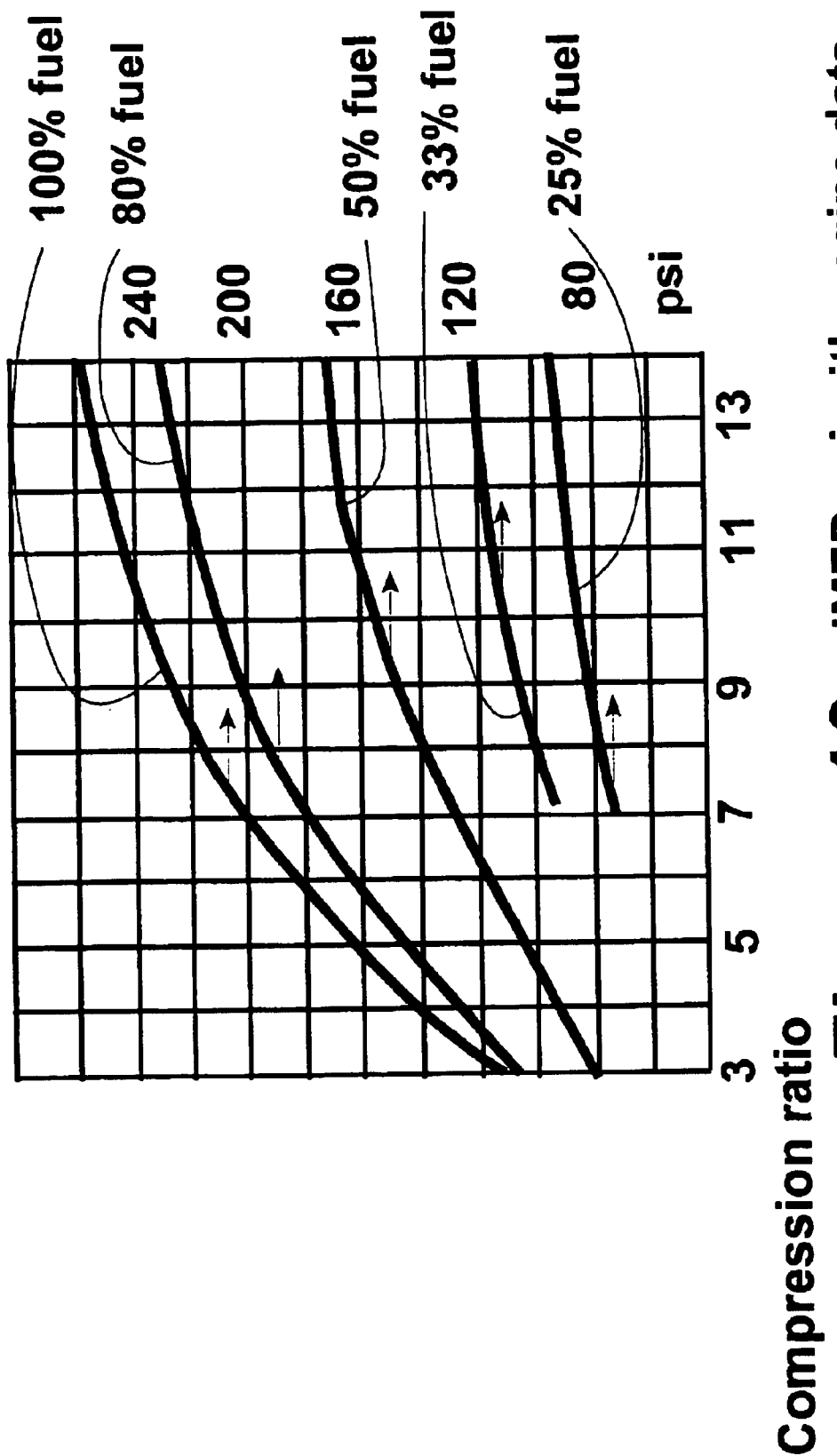
FIG. 10 is a graph showing the indicated mean effective pressure (IMEP) of an internal spark-ignited engine with various compression ratios and fuel-air ratios relative to stoichiometric ratio. The data in FIGS. 10, 11 and 12 follow Ricardo, referenced above, and standard texts on mechanical engineering.
Figure 11:
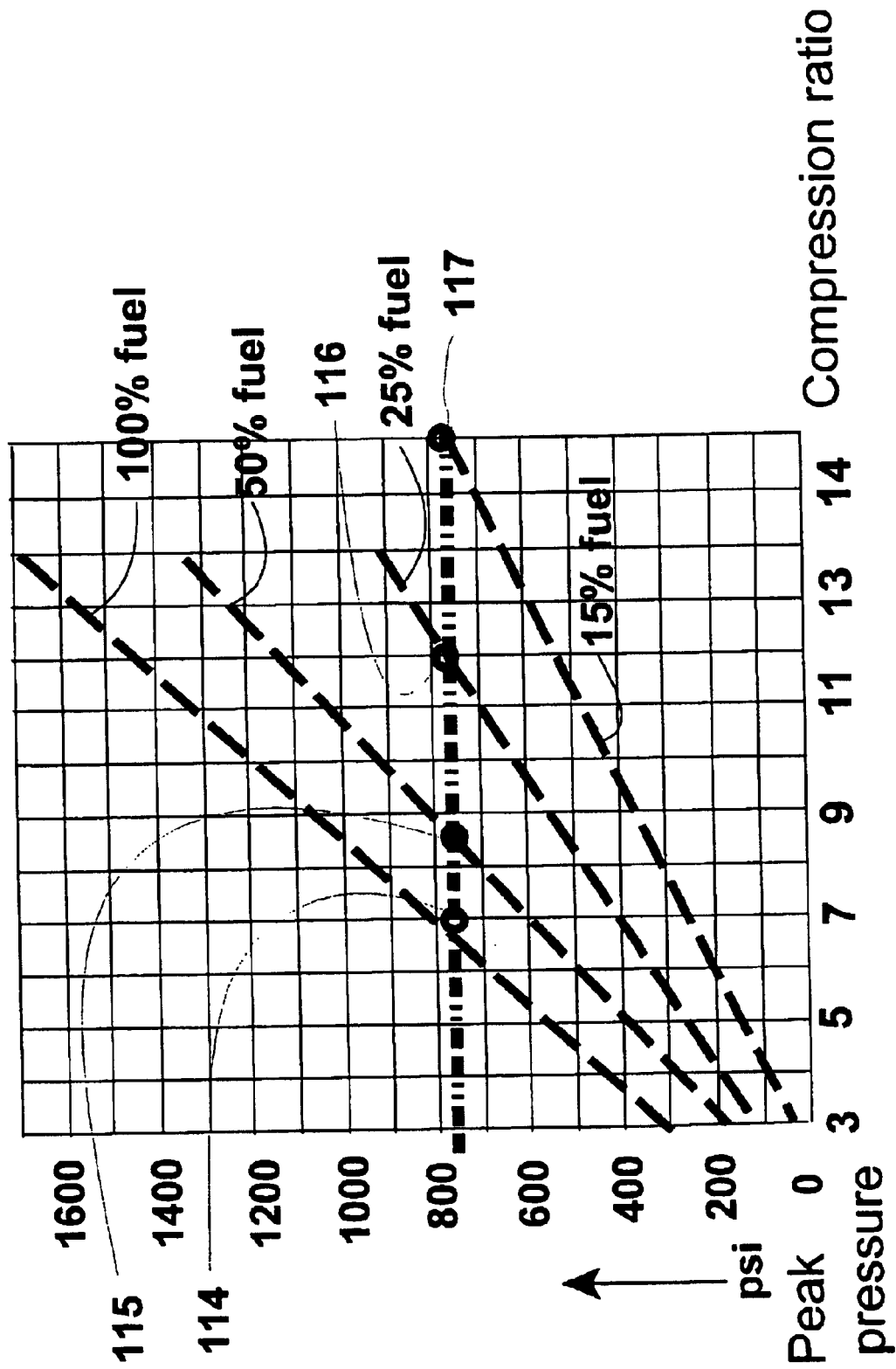
FIG. 11 is a graph of the theoretical peak pressure in a spark ignited engine at various compression ratios and fuel-air ratios relative to stoichiometric ratio.
Figure 12:
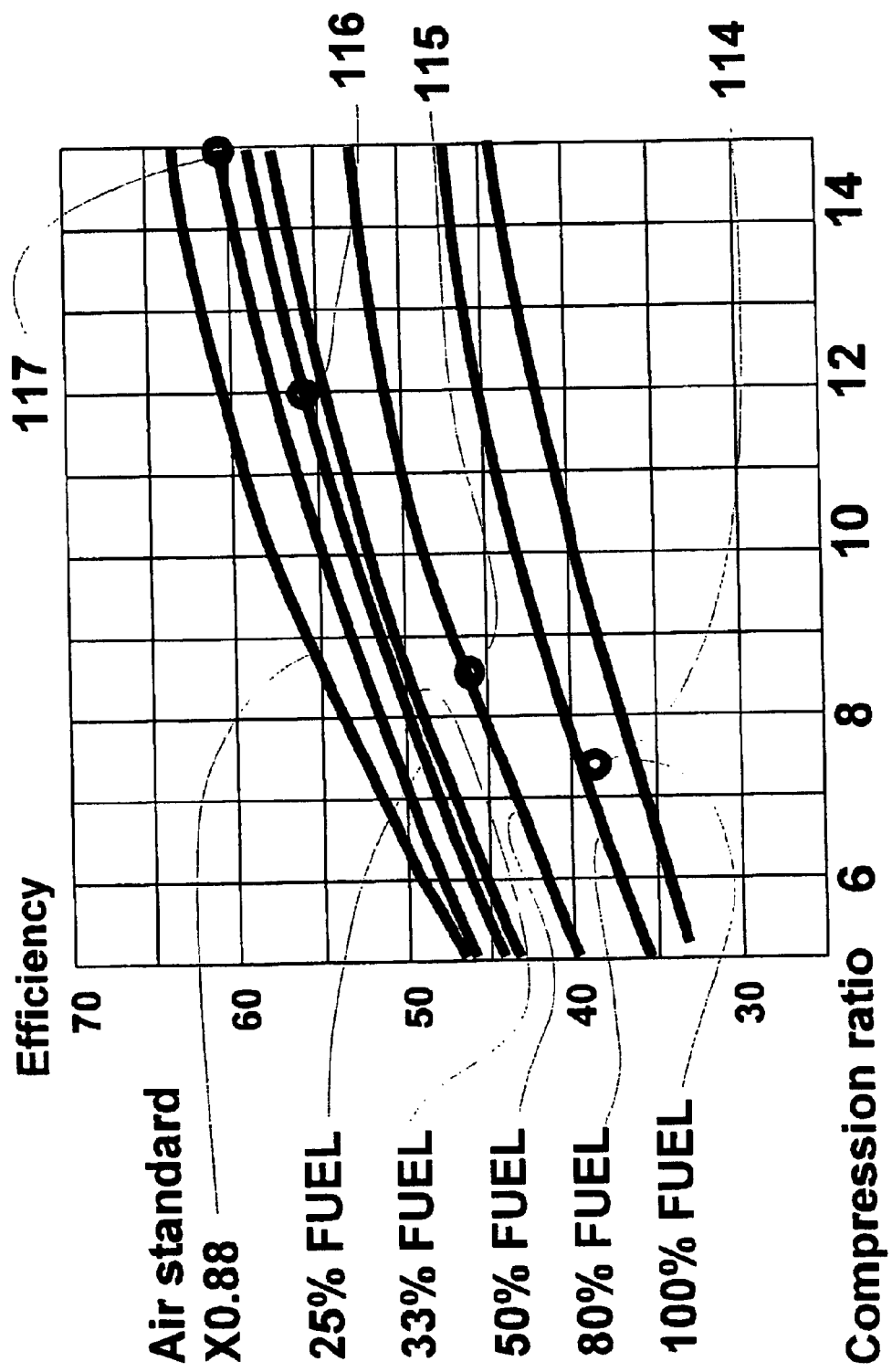
FIG. 12 is a graph of indicated efficiency of a spark ignited internal combustion engines with various combinations of compression ratio and fuel-air ratios relative to stoichiometric ratio.

FIG. 10 shows the relationship of compression ratio of a spark-ignited engine relative to the amount of fuel supplied to the air in the engine and the IMEP produced by the engine. FIG. 11 shows how the peak pressure created by the same sort of engine varies with both compression ratio and ratio of fuel supplied. FIG. 12 shows how basic indicated efficiency varies with compression ratio and amount of fuel supplied relative to a stoichiometric ratio. The relationships shown in these three Figures are all manipulated in the VCRC engine concept to produce the highest efficiency in a light weight engine.

The position of the central pivot point 160 of gear 29 will change the relationship between amount of fuel supplied and the compression ratio of the engine. As pivot point 160 moves away from fuel pump controller 135 a given amount of fuel supplied to the engine will result in a lower compression ratio. A servo motor 132 suitably designed for the task is positioned as shown in FIG. 13. A signal to servo motor 132 will position pivot point 160 to effect a suitable balance between compression ratio and fuel supplied. As speed increases pivot point 160 will be positioned closer to fuel pump controller 135 so as to effect a higher compression ratio for a given amount of fuel supplied for each engine cycle. This will increase efficiency as speed increases as noted in the section on control of the system discussed previously.

| Point # | Fuel ratio supplied | Comp. Ratio | IMEP (FIG. 10) |
|---------|--------------------|-------------|----------------|
| 124 | 85% | 7:1 | 185 psi |
| 125 | 50% | 8.5:1 | 145 psi |
| 126 | 25% | 12:1 | 90 psi |
| 127 | 15% | 15:1 | 60 psi |

With a frictional MEP equivalent of about 15 psi, which is about the value a two stroke engine with little drag provided by intake air would experience at a moderate speed, the torque values of these points can be characterized as; 100%, 76%, 44% and 26% respectively. The indicated efficiencies of the engine at these datum points can be seen on FIG. 12 as 38%, 46% 56% and 60%. Factoring in the frictional pressure as a mechanical efficiency by:

$$\eta_m = (IMEP - P_f)/IMEP$$

where $\eta_m$=mechanical efficiency $P_f$=frictional pressure equivalent and:

$$\eta_{oa} = \eta_0 \times \eta_m$$

where $\eta_{oa}$=overall efficiency $\eta_0$=indicated thermal efficiency from FIG. 12.

The efficiencies for each of the datum points is:

| | |
|---|---|
| Point 124 @ 100% torque | 35% |
| Point 125 @ 76% torque | 41% |
| Point 126 @ 44% torque | 47% |
| Point 127 @ 26% torque | 50% |

The calculations are only approximate but contrast greatly with an equivalent range of efficiencies for a conventional automobile engine from 28% efficiency at 100% torque to about 20% efficiency at about 30% of full torque. The VCRC engine is enough lighter than a conventional four-cycle engine in automobile service to provide an automobile system weight about 80% to 85% as heavy as a conventional system using a four-stroke engine. The overall fuel mileage is thus calculated to be about 3 times as good as the conventional system considering that the typical torque needed at average speeds is about 30%.

The VCRC concept can be reduced to mechanical practice with many different conventional mechanisms employed to provide operation. FIG. 1 shows the version that is chosen to describe the system. This and the other drawings show one method for illustration purposes but many others could be used. The methods of varying the compression ratio and regulating the fuel flow could readily be chosen from many kinds of mechanical actuators to optimize various applications. The mechanical system shown here to describe the operation of the concept is one of myriad others that could be used.

A speed correction is also provided as another inventive feature. The bearings in an internal combustion engine are inevitably of the journal type: The load that can be supported by such bearings it proportional to their rotational speed. As the engine rotational speed increases the throttle linkage adjusts so that a given torque demand will result in a higher compression ratio at increased speed. Less fuel is supplied to balance out the torque demand and the result is a better fuel economy for a given level of power. This is discussed in the presentation of FIG. 2 previously shown.

Comparison of VCRC Efficiency with an Existing Engine

Ricardo shows some efficiencies of a compression-ignition (Diesel) engine using a 'Comet Mark III' combustion chamber. The engine uses a compression ratio of 15 to 1 which is the approximate ratio that a VCRC engine would have at a torque level about 26% of maximum. It is possible to compare an equivalent VCRC engine with the Ricardo example. Such comparison is slightly artificial. The naturally aspirated Ricardo example has a maximum brake MEP of about 125 psi. A VCRC engine optimally designed would utilize the capabilities of its turbo-blower and have a maximum brake MEP around 170 psi and would thus be even more efficient in a properly balanced design.

The Comet Mark III engine shown as the example in Ricardo has an efficiency of about 31% at a torque level about 26% of its maximum. The Comet Mark III engine shown would have a friction level, per Ricardo's discussion, of about 25 psi. A VCRC engine of the same size would have a friction level, per the same data shown in Ricardo, of about 9.5 psi. The efficiency of the VCRC equivalent engine would thus be about 43%, a gain of 12 percentage points or a factor of 1.38 greater efficiency. This ratio would actually be higher than this; about 45% overall efficiency for a factor of 1.45 total better than the Comet Mark III, when the effects of a leaner fuel mixture in the VCRC is taken into account.

A turbo charged VCRC engine equivalent would be about only about ⅓ as heavy as the Comet Mark III compression-ignition engine shown since the VCRC engine develops twice the power per revolution, being two-stroke instead of four-stroke, and the maximum brake MEP of an optimized turbocharged VCRC is 170 psi vs. 125 in the Comet Mark III example shown in Ricardo. The difference between 45% indicated efficiency as calculated for a direct comparison with the Ricardo data and the 50% calculated in the body of this specification arises from the difference in heat transfer within the engine and the better balance that is attained with the advantages of the turbo-charged VCRC engine. All compression-ignition engines must have a high degree of turbulence induced within the engine in order to thoroughly mix the injected spray with the superheated air during combustion since there is only about 10° of crankshaft travel to effect such mixing in the compression-ignition engine. This turbulence results in a large amount of heat transfer between the gases in a compression-ignition engine and the walls surrounding the combustion chamber and cylinder.

Such heat transfer wastes some of the energy of the burning fuel. Spark-ignition engines, such as the VCRC engine, have around 100° of crankshaft travel to mix fuel and air and thus need less turbulence. Consequently spark-ignition engines incur less wasteful heat transfer. The difference is about 10% of the total delivered efficiency.

Although various arrangements and modifications have been discussed above, it will be appreciated that the invention is not limited thereto but encompasses all forms and variations falling within the scope of the appended claims.

What is claimed is:

1. A method of improving the efficiency of supplying air to a two-stroke internal combustion engine comprising the steps of:
   a. supplying substantially all the needed air only from an engine driven blower for all torque values less than a certain percentage of full torque; and
   b. supplying air only from a blower driven by thermal energy in the exhaust of said engine for substantially all the air required by said engine at torque values above said certain value.

2. In a two-cycle internal combustion engine using a system of blowers for scavenging air to said engine, a method of increasing the efficiency of said scavenging process comprising the steps of:
   a. supplying substantially all the needed air only from an engine driven blower for all torque values less than a certain percentage of full torque; and
   b. supplying air only from a blower driven by thermal energy in the exhaust of said engine for substantially all the air required by said engine at torque values above said certain value.

3. The method as sent forth in claim 2 above wherein said engine driven blower is of the centrifugal type.

4. The method as sent forth in claim 2 above wherein said blower driven by thermal energy is of the centrifugal type.

* * * * *